(12) United States Patent
Kim et al.

(10) Patent No.: US 12,147,144 B2
(45) Date of Patent: Nov. 19, 2024

(54) BEAM DEFLECTOR, METHOD FOR OPERATING THE BEAM DEFLECTOR AND EYE TRACKING DEVICE BASED ON THE BEAM DEFLECTOR

(71) Applicant: SAMSUNG ELECTRONICS CO., LTD., Suwon-si (KR)

(72) Inventors: Young Kim, Yongin-si (KR); Byonggwon Song, Seoul (KR); Hongsuk Kim, Seoul (KR); Hoon Song, Yongin-si (KR); Kanghee Won, Seoul (KR); Hongseok Lee, Seoul (KR); Sunghee Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 402 days.

(21) Appl. No.: 17/556,490

(22) Filed: Dec. 20, 2021

(65) Prior Publication Data
US 2022/0404681 A1    Dec. 22, 2022

(30) Foreign Application Priority Data

Jun. 21, 2021 (KR) .................. 10-2021-0080362

(51) Int. Cl.
*G02F 1/29* (2006.01)
*G02F 1/31* (2006.01)
(Continued)

(52) U.S. Cl.
CPC .................. *G02F 1/31* (2013.01); *G02F 1/29* (2013.01); *G06F 3/013* (2013.01); *G02B 30/00* (2020.01); *G02B 30/22* (2020.01)

(58) Field of Classification Search
None
See application file for complete search history.

(56) References Cited

U.S. PATENT DOCUMENTS

| 5,854,613 A | 12/1998 | Soltan et al. |
| 7,136,553 B2 | 11/2006 | Kwon et al. |
| (Continued) | | |

FOREIGN PATENT DOCUMENTS

| CN | 112198733 A | 1/2021 |
| EP | 1465004 A1 | 10/2004 |
| (Continued) | | |

OTHER PUBLICATIONS

Communication issued Aug. 5, 2022 by the European Patent Office in European Patent Application No. 22154100.6.
(Continued)

*Primary Examiner* — Thanh Nhan P Nguyen
(74) *Attorney, Agent, or Firm* — Sughrue Mion, PLLC

(57) ABSTRACT

Provided is a beam deflector including: a first electrode layer including a plurality of electrode patterns that are arranged in a first direction; a second electrode layer provided to oppose the first electrode layer; a liquid crystal layer provided between the first electrode layer and the second electrode layer in a second direction perpendicular to the first direction, and including a plurality of liquid crystal molecules; an input channel unit including a plurality of input channels; a demultiplexer configured to divide each of the input channels into a preset number of divided channels, and connect the divided channels to the electrode patterns; and a control circuit connected to the demultiplexer, and configured to control an output signal output from the divided channels to the first electrode layer.

19 Claims, 22 Drawing Sheets

(51) Int. Cl.
   *G06F 3/01*     (2006.01)
   *G02B 30/00*    (2020.01)
   *G02B 30/22*    (2020.01)

(56)           References Cited

U.S. PATENT DOCUMENTS

| 7,212,704 | B2 | 5/2007 | Ducellier et al. |
| 10,788,727 | B2 | 9/2020 | Kim et al. |
| 2010/0157399 | A1 | 6/2010 | Kroll et al. |
| 2010/0209109 | A1 | 8/2010 | Holmes |
| 2010/0277658 | A1 | 11/2010 | Yue et al. |
| 2013/0272650 | A1 | 10/2013 | Ishikawa et al. |
| 2017/0193918 | A1 | 7/2017 | Bae |
| 2018/0129105 | A1 | 5/2018 | Kim et al. |
| 2019/0331980 | A1 | 10/2019 | Kim et al. |
| 2022/0404681 | A1 | 12/2022 | Kim et al. |

FOREIGN PATENT DOCUMENTS

| JP | 5692865 B2 | 4/2015 |
| KR | 10-0679241 B1 | 2/2007 |
| KR | 10-2009-0094078 A | 9/2009 |
| KR | 1020220169807 A | 12/2022 |
| WO | 2008/049917 A1 | 5/2008 |

OTHER PUBLICATIONS

Manko, "Optimization of Optical Phase Profile in Beam Deflector with Advanced Simulation Method for High Diffraction Efficiency," Micromachines, 2022, 13, 802, XP093062356, (12 total pages).
Communication issued Jul. 18, 2023 by the European Patent Office in European Application No. 22154100.6.

SOURCE CHANNEL DRIVING CONDITION

BEAM DEFLECTOR, METHOD FOR OPERATING THE BEAM DEFLECTOR AND EYE TRACKING DEVICE BASED ON THE BEAM DEFLECTOR

CROSS-REFERENCE TO RELATED APPLICATION

This application is based on and claims priority under 35 U.S.C. § 119 to Korean Patent Application No. 10-2021-0080362, filed on Jun. 21, 2021, in the Korean Intellectual Property Office, the disclosure of which is incorporated by reference herein in its entirety.

BACKGROUND

1. Field

The present disclosure relates to beam deflectors, and more particularly, to beam deflectors capable of producing three-dimensional (3D) images or enabling 3D images to be viewed when light is incident, by causing deflection of the incident light based on an electrical signal, and methods for operating the same.

2. Description of the Related Art

Devices for deflecting incident light in a desired direction have been used widely in various fields. In particular, the larger an area on which light is incident is, the more effectively the light can be deflected by improving the deflection efficiency through an increased degree of integration of a system. A device that deflects or diffracts incident light in a desired direction as described above is referred to as a beam deflector or a beam diffractometer.

A beam deflector can be widely used in a three-dimensional (3D) display that requires eye-tracking, and in particular, in a holographic display system that generates and transmits a holographic image to both eyes of a user to provide a stereoscopic image to the user.

Various deflection elements and/or diffraction elements are used to transmit an image converted into a 3D image to the user's left eye and right eye, respectively. For example, a beam deflection element may be used in a lens for 3D glasses worn by a user to view a 3D image.

SUMMARY

One or more example embodiments provide a beam deflector, a method for operating the beam deflector, and an eye-tracking device implemented by the beam deflector.

According to an aspect of an example embodiment, a beam deflector may include: a first electrode layer including a plurality of electrode patterns that are arranged in a first direction; a second electrode layer provided to oppose the first electrode layer; a liquid crystal layer provided between the first electrode layer and the second electrode layer in a second direction perpendicular to the first direction, and including a plurality of liquid crystal molecules; an input channel unit including a plurality of input channels; a demultiplexer (DEMUX) configured to divide each of the input channels into a preset number of divided channels, and connect the divided channels to the electrode patterns; and a control circuit connected to the DEMUX, and configured to control an output signal output from the divided channels to the first electrode layer.

The plurality of liquid crystal molecules may include positive liquid crystal molecules that move in the second direction according to a voltage applied to the electrode patterns.

A number of the DEMUX may be identical to a number of the input channels.

The DEMUX may include a same number of switches as a number of the divided channels.

Each of the switches may be a thin-film transistor (TFT).

The TFT may be a P-type TFT.

The control circuit may be configured to control output times of output signals output from the divided channels, to avoid an overlap of the output times.

The control circuit may be configured to control output signals from the respective divided channels, by controlling an on and off state of switches provided in each of the divided channels.

The control circuit may include a plurality of control channels, and a number of the plurality of control channels may be identical to a number of the divided channels.

The beam deflector may further include a channel sequence change circuit configured to change a sequence of the divided channels included in the DEMUX for a preset period.

The channel sequence change circuit may be configured to randomly change the sequence of the divided channels.

The channel sequence change circuit may be configured to randomly change the sequence of the divided channels, excluding preset sequences.

According to an aspect of another example embodiment, an operating method of a beam deflector may include: receiving, by an input channel unit including a plurality of input channels, a deflection control signal and a channel control signal; dividing, by the input channel unit, the deflection control signal for each demultiplexer (DEMUX) dividing the plurality of input channels into a plurality of divided channels; controlling, by a control circuit, output times of output signals output from the plurality of divided channels based on the channel control signal, to avoid an overlap of the output times; and deflecting an incident light by liquid crystal molecules that move according to a voltage is applied an electrode layer.

The deflection control signal and the channel control signal may be included in one video image of a preset resolution.

The deflecting by the liquid crystal molecules may include, when an optical path conversion surface is formed by movement of the liquid crystal molecules, a refractive index of the incident light may change at the optical path conversion surface.

An eye-tracking device may include two of the beam deflector.

The eye-tracking device may not be provided with a component that provides steering in a Z-axis direction, and may be implemented with the two beam deflectors overlapping in the Z-axis direction.

The eye-tracking device may not be provided with a lens that concentrates light deflected by the two beam deflectors to provide the concentrated light to a user, and may be implemented with the two beam deflectors overlapping.

According to an aspect of another example embodiment, an electronic device may include: a plurality of input channels; a plurality of demultiplexer connected to the plurality of input channels in a one-to-one correspondence, and configured to receive a plurality of input signals from the plurality of input channels, respectively, wherein each of the plurality of demultiplexers is configured to receive one of the plurality of input signals, and is connected to a plurality of different selection lines to obtain a plurality of output signals by processing the one of the plurality of input signals in a plurality of different manners according to the plurality of different selection lines; a beam deflector including a first electrode layer, a second electrode layer, and a liquid crystal layer disposed between the first electrode layer and the second electrode layer, and configure to deflect a light incident onto the beam deflector by applying a voltage between the first electrode layer and the second electrode layer based on the plurality of output signals from the plurality of demultiplexers; and a display configured to generate an image based on the deflected light.

Each of the plurality of demultiplexers may include a plurality of switches connected to the plurality of different selection lines, and configured to turn on according to control signals from the plurality of different selection lines, respectively.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
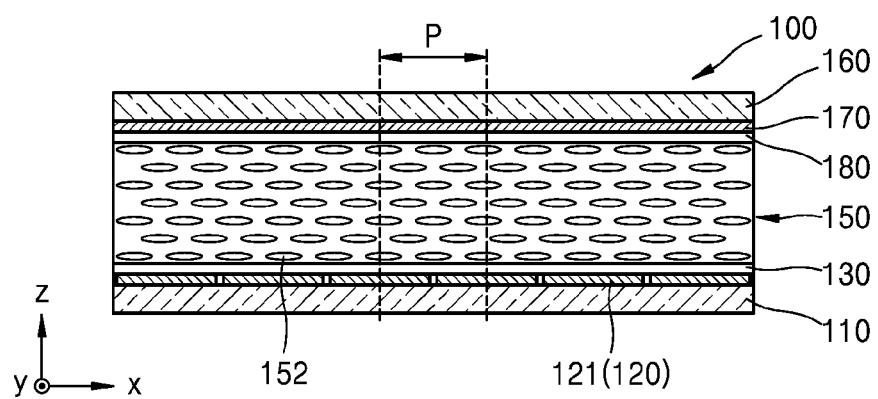
FIG. 1 is a cross-sectional view of a schematic structure of a liquid crystal beam deflector 100 according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

General terms which are currently used widely have been selected for use in consideration of their functions in embodiments; however, such terms may be changed according to an intention of a person skilled in the art, precedents, advent of new technologies, etc. Further, in certain cases, terms have been arbitrarily selected by the applicant, and in such cases, meanings of the terms will be described in detail in corresponding descriptions. Accordingly, the terms used in the embodiments should be defined based on their meanings and overall descriptions of the embodiments, not simply by their names.

In the specification, when a portion "includes" an element, another element may be further included, rather than excluding the existence of the other element, unless otherwise described. In addition, the terms " . . . part," "module," etc., described in the specification refer to a unit for processing at least one function or operation, which can be implemented by a hardware or a software, or a combination of a hardware and a software.

Hereinafter, embodiments of the present disclosure will be described in detail with reference to the accompanying drawings so that a person with ordinary skill in the art may easily perform the present disclosure. However, the present disclosure may be implemented in various different forms and is not limited to embodiments described herein.

When a component is "on," "on the top of," etc. another component, it shall be understood that not only the component may be directly on another component, but also it may be on another component in a non-contact manner.

Hereinafter, embodiments of the present disclosure will be described in detail with reference to the drawings.

FIG. 1 is a cross-sectional view of a schematic structure of a liquid crystal beam deflector 100 according to an example embodiment.

With reference to FIG. 1, the liquid crystal beam deflector 100 may include a first substrate 110 and a second substrate 160 which are arranged side by side facing each other in a y-direction. A first electrode layer 120 may be formed on the first substrate 110, and a second electrode layer 170 may be formed on the second substrate 160. The first electrode layer 120 and the second electrode layer 170 may be arranged to face each other. The first substrate 110 and the second substrate 160 may be an insulating substrate. The first substrate 110 and the second substrate 160 may be made of glass or plastic.

The first electrode layer 120 may include a plurality of electrode patterns 121. The electrode patterns 121 may be arranged side by side. The electrode patterns 121 may be arranged at a constant pitch P in a first direction. In FIG. 1, the electrode patterns 121 are arranged at a constant pitch in a x direction.

For example, the pitch P of the electrode patterns 121 may be about 2 μm. When a narrow pattern pitch P is formed, a deflection angle of the beam deflector may increase. The electrode patterns 121 may have the same width. The width of the electrode pattern 121 may be about 1.5 μm, and the length of the electrode pattern 121 may be about 14 mm.

For example, the first electrode layer 120 may include 7200 electrode patterns 121. For another example, the first electrode layer 120 may include 18096 electrode patterns 121. FIG. 1 illustrates six electrode patterns 121 for convenience of description. The electrode pattern 121 may be formed in line in a second direction (e.g., the y direction).

The electrode patterns 121 may be made of a transparent conductive material. For example, the electrode patterns 121 may include any one or any combination of an indium-tin-oxide (ITO), indium-zinc-oxide (IZO), indium-tin-zinc-oxide (ITZO), etc. A flat-type electrode described below may also be made of a transparent conductive material as in the electrode patterns 121.

The second electrode layer 170 may be a flat-type common electrode. However, example embodiments of the present disclosure are not limited thereto. For example, the second electrode layer 170 may be made of a plurality of electrode patterns 121 as in the first electrode layer 120. In this case, the same voltage may be applied to the electrode patterns 121 of the second electrode layer 170. The second electrode layer 170 may be made of the same transparent conductive material as in the first electrode layer 120. A first alignment layer 130 may be provided on the first electrode layer 120 to cover the first electrode layer 120.

Figure 2:
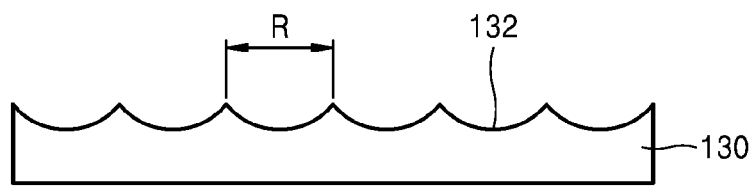
FIG. 2 is a diagram schematically showing a side cross-sectional view of a first alignment layer.

FIG. 2 is a diagram schematically showing a side cross-sectional view of a first alignment layer.

Multiple recesses 132 may be formed in line in the second direction orthogonal to the first direction on a top surface of the first alignment layer 130 of FIG. 2. The recesses 132 may be recessed into a bottom surface of the first alignment layer 130, in a direction that is orthogonal to an arrangement direction of the electrode patterns 121 of the second electrode layer 170. Each recess 132 may have a hemispherical shape, and a diameter R of hundreds of nanometers (nm).

Referring back to FIG. 1, a liquid crystal layer 150 made of liquid crystal molecules 152 may be arranged on the first alignment layer 130. The liquid crystal molecules 152 may have an oval shape, and a long diameter different from a short diameter, and the long diameter may be arranged in the first direction. Although approximately two liquid crystal molecules 152 are formed in the horizontal direction (the x direction) in one pitch in FIG. 1, such description is provided merely as an example. The plurality of liquid crystal molecules 152 may be arranged in the horizontal direction of one pitch.

A second alignment layer 180 may be formed between the liquid crystal layer 150 and the second electrode layer 170. A plurality of recesses 132 like the recesses 132 of the first alignment layer 130 may be formed at a surface of the second alignment layer 180 in contact with the liquid crystal layer 150. The recesses 132 of the second alignment layer 180 may be formed in line in the first direction. The recesses 132 of the second alignment layer 180 may be arranged in a direction orthogonal to first electrode patterns. In FIG. 1, the recesses 132 of the second alignment layer 180 are omitted for convenience.

The first alignment layer 130 and the second alignment layer 180 may be made of polyimide.

A plurality of spacer balls may be arranged between the first alignment layer 130 and the second alignment layer 180. The spacer ball may have a diameter of about 2.5 to 3 μm. A distance between the first alignment layer 130 and the second alignment layer 180 may remain constant by the spacer balls. The spacer ball may be formed of a polymer material.

The liquid crystal molecule 152 may be a positive liquid crystal molecule. The positive liquid crystal molecule may be arranged in a direction orthogonal to the electrode patterns 121, and when a voltage is applied between the electrode patterns 121 of the first electrode layer 120 and the second electrode layer 170, the liquid crystal molecules 152, which have been arranged in line in the first direction, may move in the vertical direction with respect to the first substrate 110 according to a level of the applied voltage. According to such a change of the position of the liquid crystal molecules 152, phase modulation may occur with respect to light incident on the first electrode layer 120.

The liquid crystal beam deflector 100 according to an example embodiment may use an electrode pattern having a small width, and because of a thin liquid crystal layer, the size of the liquid crystal beam deflector 100 may also be small and slim.

Figure 3:
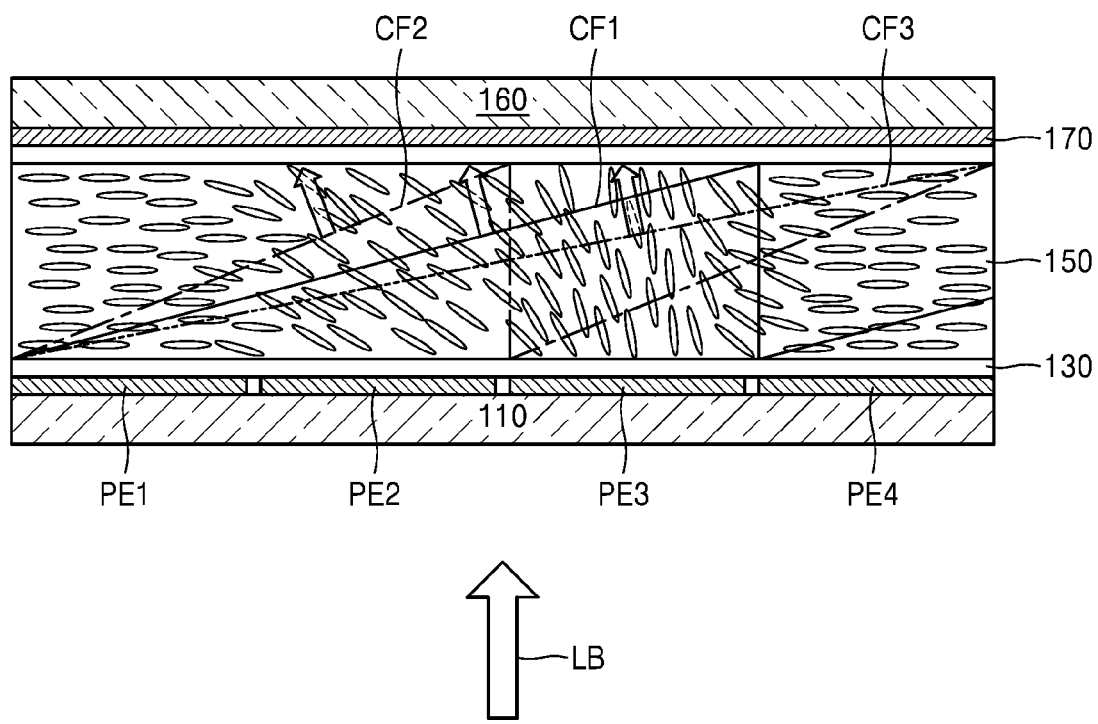
FIG. 3 is a diagram for explaining operations of the liquid crystal beam deflector 100 according to an example embodiment.

FIG. 3 is a diagram for explaining operations of the liquid crystal beam deflector 100 according to an example embodiment.

Hereinafter, components which are identical to the components of FIG. 1 may be denoted by the same reference numerals, and redundant descriptions will be omitted.

FIG. 3 illustrates that four electrode patterns (i.e., a first electrode pattern PE1, a second electrode pattern PE2, a third electrode pattern PE3, and a fourth electrode pattern PE4) of the liquid crystal beam deflector 100 are arranged on the first substrate 110, for convenience of description. The first to fourth electrode patterns PE1 to PE4 may refer to four electrodes arranged consecutively among the electrode patterns 121 of FIG. 1. Due to a difference in voltage across the common electrode 170 and each of the first to fourth electrode patterns PE1 to PE4, an electric field may be formed at respective electrode pattern areas. When a ground voltage GND is applied to the common electrode 170, and 0 V is applied to the first electrode pattern PE1, the liquid crystal molecules 152 may be arranged side by side with the recesses 132 of the first substrate 110. That is, when 0 V is applied, the liquid crystal molecules 152 may not move. The liquid crystal molecules 152 may maintain an initial arrangement.

As a voltage applied to the electrode patterns (hereinafter, "a first applied voltage") gradually increases, the liquid crystal molecules 152 may move in a direction perpendicular to the first substrate 110. When the first applied voltage reaches a threshold voltage, the liquid crystal molecules 152 may be arranged perpendicular to the first substrate 110.

For example, in FIG. 3, the threshold voltage may be 5 V. A threshold voltage has been applied to the third electrode pattern PE3, and 2.5 V has been applied to the second electrode pattern PE2. As voltages that respectively applied to the first to fourth electrode patterns PE1 to PE4 increase in the order of the first to the fourth electrode patterns PE1 to PE4, resulting in increased retardation, phases of light incident on the respective electrode patterns may be retarded, accordingly. When the threshold voltage is applied to the electrode patterns, and the liquid crystal molecules 152 are formed perpendicular to the first substrate 110, retardation of light incident on a corresponding electrode area may become $2\pi$.

As a voltage applied to the first to fourth electrode patterns PE1 to PE4 increases, a retardation size of light increases, and accordingly, an optical path conversion surface CF1 may be formed in certain areas (e.g., three electrode pattern areas in FIG. 3). That is, a virtual prism may be formed. The virtual prism may repeatedly appear in the first direction of the liquid crystal beam deflector 100. The number of electrode patterns 121 forming one prism may be changed by a voltage applied to the electrode patterns. That is, when 0 V and a threshold voltage (5 V) are applied sequentially to two adjacent electrode patterns 121, one prism may be formed per two electrode patterns. An optical path conversion surface CF2 of such a case is shown in alternate long and short dash lines in FIG. 3. Here, m represents the number of the electrode patterns 121, and may be an integer between 2 to n. n is an integer, and an n number of electrode patterns may constitute one unit electrode, as described later.

When a voltage is sequentially applied to the first to fourth electrode patterns PE1 to PE4, i.e., 0 V, 5/3 V, 10/3 V, and 5 V are applied to the first to fourth electrode patterns PE1 to PE4, respectively, one optical path conversion surface CF3 (shown in alternate long and two short dashes line in FIG. 3) per four electrode patterns may be formed.

That is, when a voltage applied to m electrode patterns is increased sequentially from 0 V to the threshold voltage (e.g., 5 V), one prism may be formed at m electrode pattern areas.

The laser beam LB incident on the first substrate 110 may be refracted at the optical path conversion surfaces CF1 to CF3 and then emitted. The laser beam LB may be one of red light, green light, and blue light. As a refractive index at each of the optical path conversion surfaces CF1 to CF3 is adjusted by controlling a voltage applied to the electrode patterns 121, an emission angle of light traveling through the liquid crystal layer 150 may be adjusted. That is, as a path of light is changed by a voltage applied to the electrode patterns 121, the beam deflection function may be implemented. By using the beam deflection function, red light, green light, and blue light may be emitted in the same direction.

Figure 4:
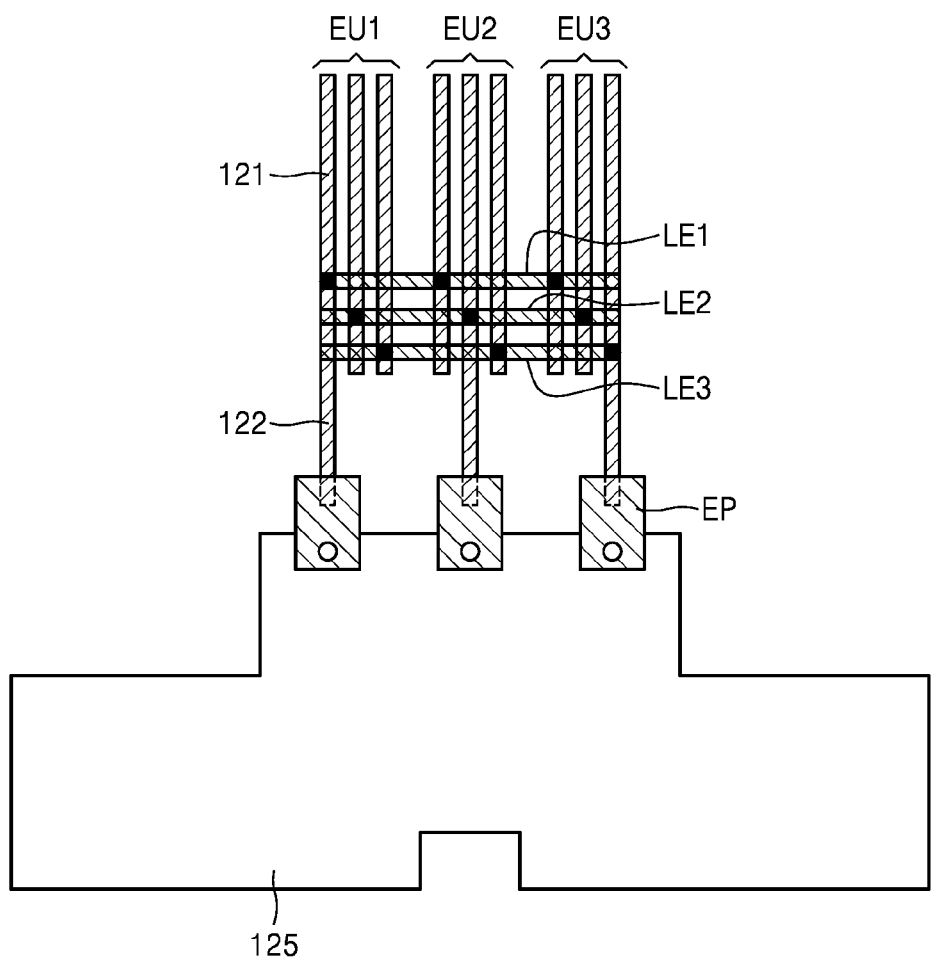
FIG. 4 is a planar view illustrating an arrangement of electrode patterns of a first electrode layer of a liquid crystal beam deflector according to an example embodiment.

FIG. 4 is a planar view illustrating arrangement of electrode patterns of a first electrode layer of a liquid crystal beam deflector according to an example embodiment.

For convenience of description, only the electrodes and the devices connected to electrodes are illustrated in FIG. 4.

With reference to FIG. 4, the first electrode layer 120 may include a plurality of electrode patterns 121. The electrode patterns 121 may be divided into a plurality of, for example, 10 unit electrodes. Each unit electrode may include 720 electrode patterns. The 720 electrode patterns may correspond to electronic components to which the electrode patterns are connected, for example, 720 channels of a driving integrated circuit (IC) used in a holography display. When the driving IC includes 1024 channels, each unit electrode may include 1024 electrode patterns. Hereinafter, a case in which the first electrode layer 120 includes 7,200 electrode patterns is described as an example.

As the electrode pattern 121 of the liquid crystal beam deflector 100 according to an example embodiment has a narrow width of about 2 μm, which results in an increased deflection angle and the greater number of electrode patterns 121 included in one unit electrode area, the resolution of a display device employing the liquid crystal beam deflector 100 may be improved. The 10 unit electrodes are used in an example embodiment so that a laser beam incident on the liquid crystal beam deflector 100 may have a diameter of 14 mm to improve the incidence efficiency.

That is, when 720 electrode patterns having the width of 2 μm are used for the first electrode layer, the incidence length of the first electrode layer is 1.4 mm, and accordingly, relatively ten times more wave guides may be used compared to the case where a laser in an example embodiment beam has a diameter of 14 mm. When 10 unit electrodes are used as described in an example embodiment, a diameter of a laser beam incident on the first electrode layer may increase, and the number of wave guides required for a reduction process of laser beam may decrease, which leads to improved efficiency of the laser beam.

FIG. 4 illustrates a case where the first electrode layer 120 includes three unit electrodes, i.e., a first unit electrode EU1, a second unit electrode EU2, and a third unit electrode EU3, including three electrode patterns 121.

The $i^{th}$ electrode pattern 121 of each of the first to third unit electrodes EU1 to EU3 may be electrically connected to each other by the $i^{th}$ line electrode LE. Three black circles connected to the $i^{th}$ line electrode LE may represent a via metal connecting the $i^{th}$ electrode pattern 121 to the $i^{th}$ line electrode LE.

One of the ten electrode patterns connected to the $i^{th}$ line electrode LE may include an extension 122 for external connections. That is, the first electrode layer 120 may include 720 extensions 122. These extensions 122 may be arranged at regular intervals. For example, the extensions 122 may be arranged at intervals of ten electrode patterns (i.e., intervals of 20 μm). In this case, the extensions 122 of the first unit electrode EU1 may be the extensions 122 of the $1^{st}$, $11^{th}$, $21^{st}$, . . . , $711^{th}$ electrode patterns, and the extensions 122 of the second unit electrode EU2 may be the extensions 122 of the $2^{nd}$, $22^{nd}$, $32^{nd}$, . . . , $712^{th}$ electrode patterns. In this manner, 720 extensions 122 may be formed.

Each extension 122 may be connected to a corresponding electrode pad EP. That is, 720 electrode pads EP may be formed. The electrode pad EP may be formed of metal, for example, molybdenum (Mo).

The electrode pads EP may be bonded to a driving IC 125. A white circle formed at the electrode pad EP may represent an electric connection between the electrode pad EP and the driving IC 125.

Through 720 electrode pads EP, a voltage may be distinctively applied to 720 electrode patterns 121. As a result, a desired voltage may be distinctively applied to 720 electrode pads EP in each unit electrode. Accordingly, an electrical prism having a desired size for each unit electrode may be formed for beam deflection.

By extension of descriptions of FIG. 4, as described with reference to FIG. 1, when the liquid crystal beam deflector 100 includes 7200 electrode patterns 121, and 10 unit electrodes, 720 electrode patterns may be included in one unit electrode, and accordingly, 720 electrode pads are required.

FIG. 4 shows that an active area is extended by utilizing vias/holes to overcome limits of a limited input driving channel. To overcome limits of the input driving channel of 720 limited channels, a unit bank may be repeated for ten times to constitute an active area by using vias/holes where the electrode patterns 121 included in the unit electrode and line electrodes LE1 to LE3 overlap. The active area may refer to an area where an incident light actually diffracts through a beam deflector.

As a result, when the beam deflector is configured as illustrated in FIG. 4, the active area may include 7200 channels (lines), and in such a manner the active area may be extended, but as the unit bank is repeated, there may be limits in representing optical phase profiles.

Figure 5:
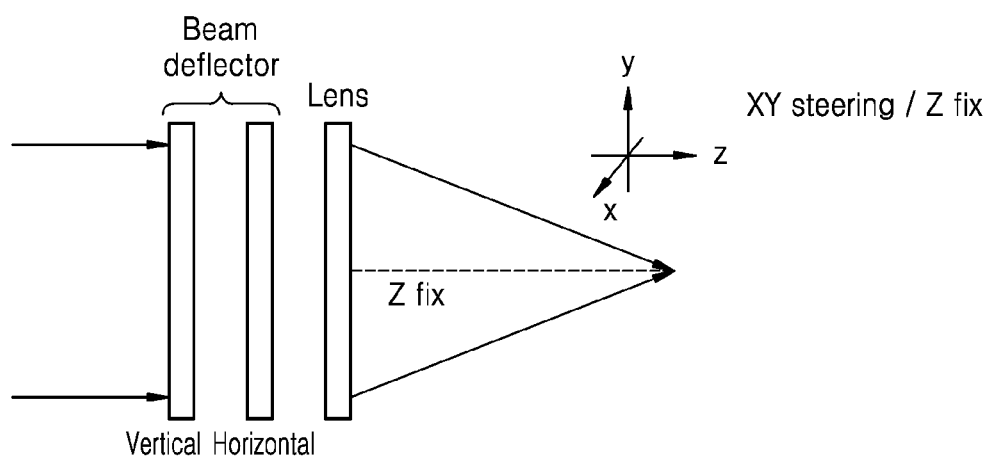
FIG. 5 is a diagram schematically illustrating an eye-tracking device implemented by the beam deflector described in FIGS. 1 to 4.

FIG. 5 is a diagram schematically illustrating an eye-tracking device implemented by the beam deflector described in FIGS. 1 to 4.

Transmitting an image which has been specifically produced for holography accurately to a user wearing a special equipment is greatly important in holographic display systems. Accordingly, to transmit a hologram image of a 2D panel to user's eyes, an eye-tracking device may be implemented by a structure in which a lens, a vertical beam deflector and a horizontal beam deflector overlap in the Z-axis direction as shown in FIG. 5.

The beam deflector may function in one dimension. Specifically, as the liquid crystal beam deflector of FIG. 3 may deflect a beam in the left or right direction according to movements of the liquid crystal molecules 152, the eye-tracking device of FIG. 5 may be constituted by combining the vertical beam deflector and the horizontal beam deflector to correspond to a hologram image provided to a user through a 2D panel, and may also include a lens to concentrate image information and transmit the concentrated image information to user's eyes.

As described above, the eye-tracking device including two beam deflectors and the lens may operate as an X/Y steering system. The X/Y steering system may include a lens to concentrate an image on one point, and a Z-steering component for z-steering which cannot be implemented by the vertical and horizontal beam deflectors. The limits of the X/Y steering system may be due to 7200 lines (channels) provided by repeating the unit bank (720 channels) multiple times (10 times) to extend the active area.

As such, the method of extending the active area by using the vias/holes to connect bank lines commonly to one input driving channel may not be the best way to unlimitedly extend the active area.

Figure 6:
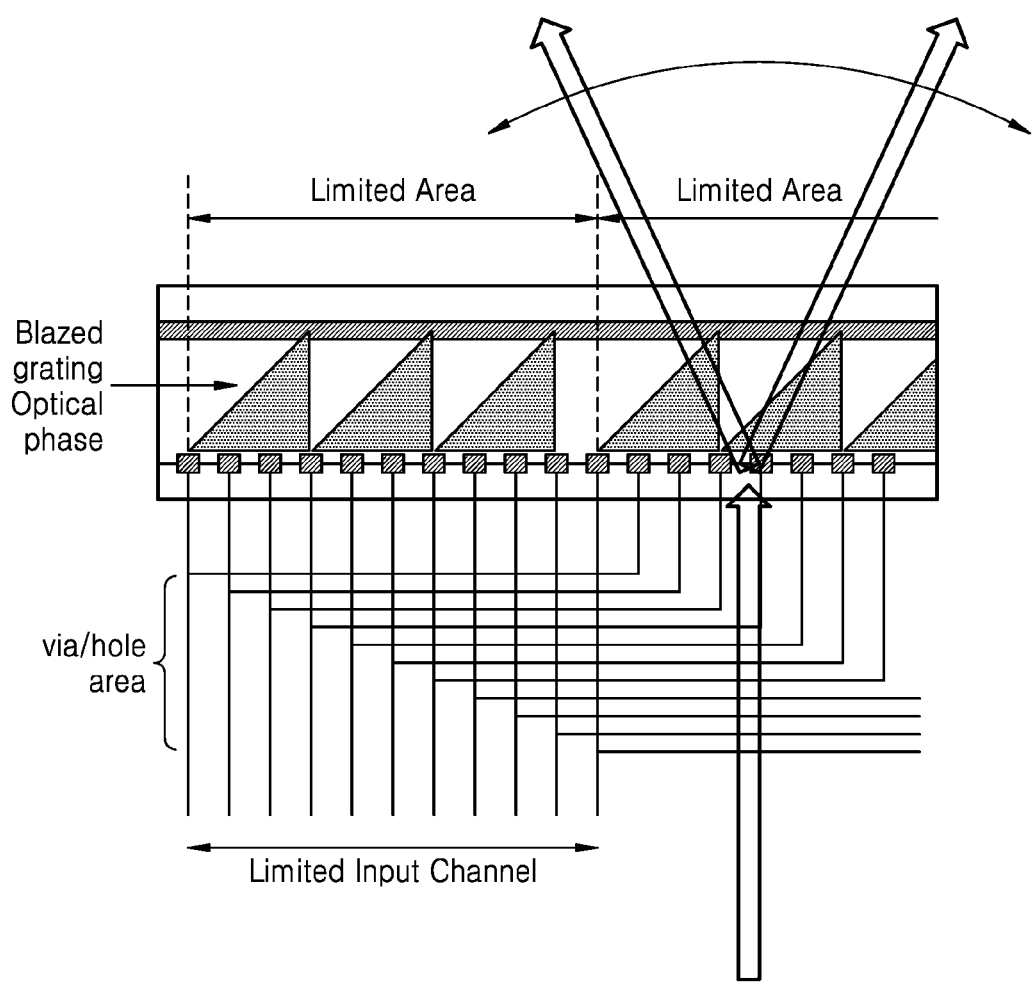
FIG. 6 is a diagram for explaining a method of extending an active area by utilizing a via/hole.

FIG. 6 is a diagram for explaining a method of extending an active region by utilizing a via/hole.

As shown in FIG. 6, when the number of lines (channels) of an active area corresponding to an input driving channel is increased unlimitedly, resulting in increased parasitic capacitance and parasitic resistance, a burden may be imposed on the driving capability of the beam deflector.

Further, as shown in FIG. 6, as one limitedly fixed pattern may be repeated in the input driving channel due to a signal commonly applied to the lines of the active area shared by the vias/holes, there may be limitations in representing blazed grating optical phase profiles, and accordingly, the z-steering utilizing the entire active area may not be performed.

Specifically, the limitation in representing the blazed grating optical phase profile may mean that the steering may be performed only in a limited area because no matter how much the number of electrode patterns 121 included in the liquid crystal beam deflector 100 is increased, the same voltage is input across the electrode patterns 121 for each period repeated in via/hole areas, and accordingly, a voltage may not be applied increasingly to the plurality of electrode patterns 121.

In turn, FIG. 6 illustrates that no matter how much the number of electrode patterns 121 is increased to extend the active area, as there may be limitations (repetitive characteristic) in hardware structures for applying a voltage to unit electrodes and electrode patterns to cause beam deflection, representation of blazed grating optical phase profile may be limited.

Figure 7:
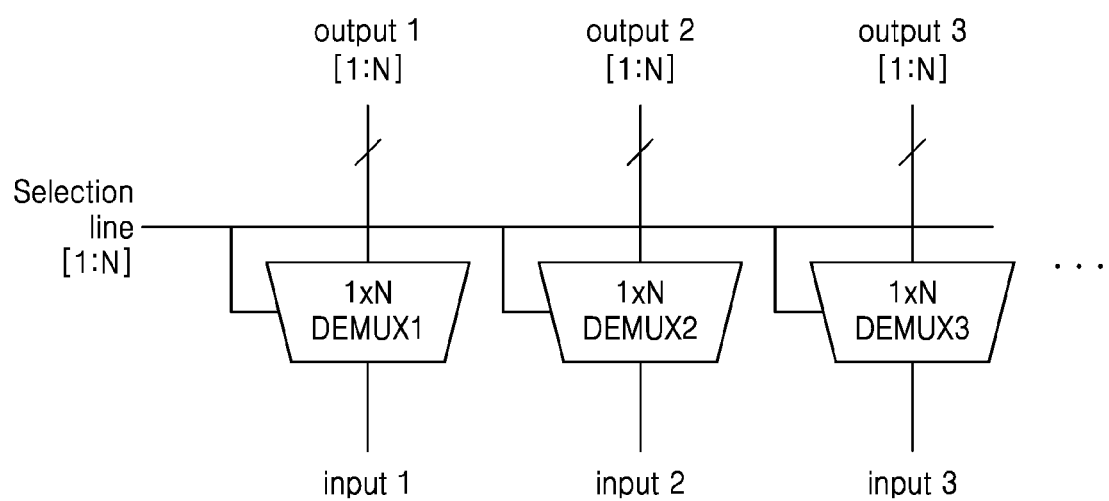
FIG. 7 is a schematic diagram of an improved input driving channel structure using a demultiplexer (DEMUX)

FIG. 7 is a schematic diagram of an improved input driving channel structure using a DEMUX according to an example embodiment.

FIG. 7 is a structure proposed to overcome the problems of the via/hole method described above, and according to the structure shown in FIG. 7, the burden imposed on the driving capability due to the parasitic capacitance and parasitic resistance may be solved. Further, according to the structure shown in FIG. 7, as different input data may be applied to each channel per time by using the DEMUX, the representation of phase profile may not be limited, and not only the left/right steering but the z-steering may also be possible.

In the input driving channel structure utilizing the DEMUX of FIG. 7, the number of output channels may be increased in a situation where the number of input channels is limited. The increase of the number of output channels may mean that the active area from which a beam is emitted through the beam deflector may be extended. In turn, the structure shown in FIG. 7 is a structure capable of implementing multichannels in a limited number of input channels, and thus, lines of a final active area may define an input signal as sample & hold.

The structure shown in FIG. 7 is implemented in a manner that a plurality of DEMUXs share one input control channel. The input control channel of each DEMUX may share sequences of multiple output channels included in the DEMUX. For example, a first input control channel of the first DEMUX corresponding to the input 1 and a first input control channel of the second DEMUX corresponding to the input 2 may be shared by one selection line. At this time, when the first input control channel is turned on, first gates of all DEMUXs may open. The gates included in the DEMUXs will be described with reference to FIG. 8.

Figure 8:
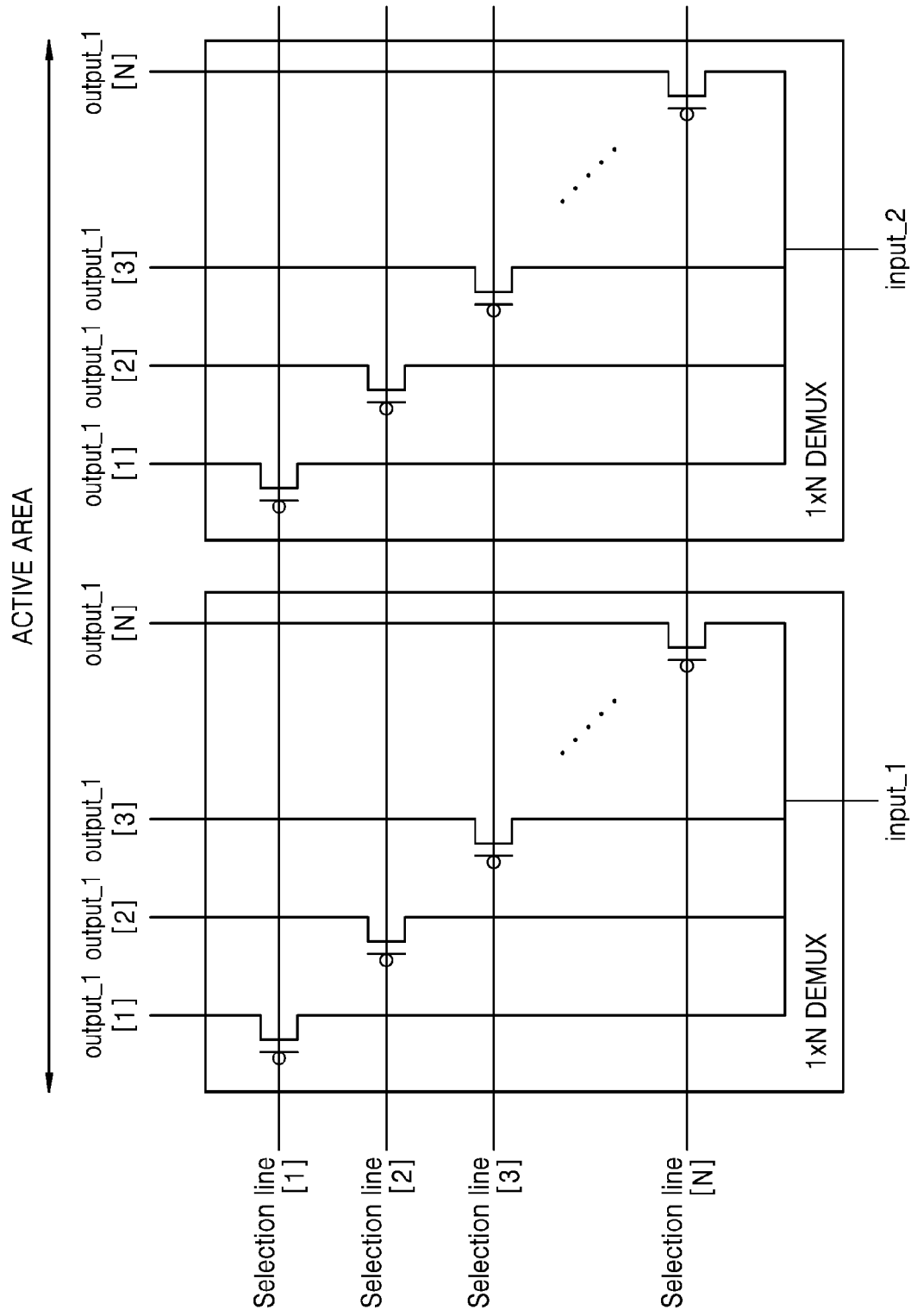
FIG. 8 is a diagram for further explaining in detail the structure described in FIG. 7.

FIG. 8 is a diagram for further explaining in detail the structure described in FIG. 7.

In FIG. 8, the switch on-off controlled by the control channel may be a single P-type thin film transistor (TFT). In addition, a driving voltage of the TFT may depend on a voltage level of data input through the input channel. In FIG. 8, N may refer to the number of channels into which one input channel is divided by the DEMUX, and the channel divided by the DEMUX will be referred to as a divided channel.

According to the structure shown in FIG. 8, the number of TFTs in the EMUX may be N, which represents the number of channels divided by the DEMUX.

Figure 9:
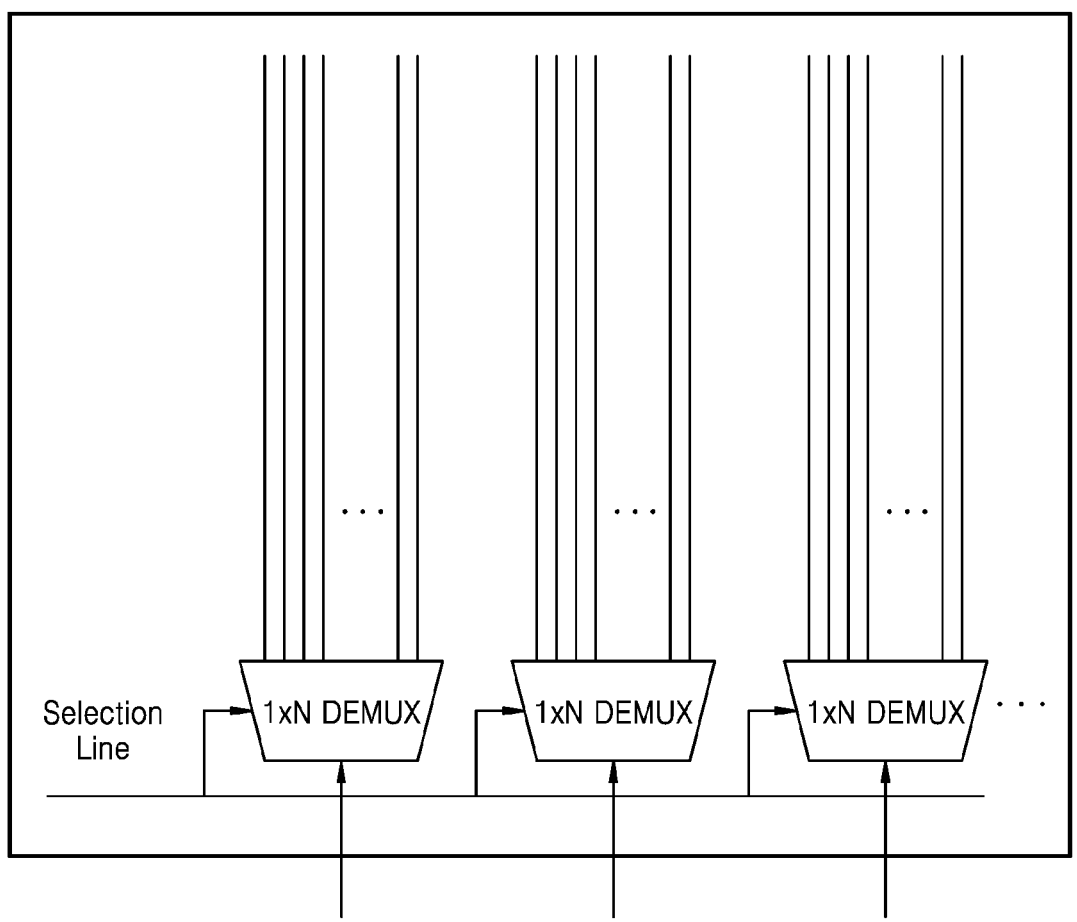
FIG. 9 is a schematic diagram of an architecture of a beam deflector lens based on the DEMUX described in FIGS. 7 and 8.

FIG. 9 is a schematic diagram of an architecture of a beam deflector lens based on the DEMUX described in FIGS. 7 and 8.

In the structure of FIG. 9, multiple divided channels may be shared by the time-multiplexing method using the DEMUX rather than a single input driving channel (input_1, input_2, etc.) engaged with multiple active lines by using the vias/holes.

In the improved structure of FIG. 9, as each divided channel (line) divided by the DEMUX is time-division controlled through a software or a firmware, not only parasitic impedance caused by simultaneous engagement of a plurality of active lines may not be an issue, but there may be no limit in representing the optical phase profile, which allows that the limit of existing beam deflectors, which is only being capable of left/right steering, may be overcome.

Figure 10:
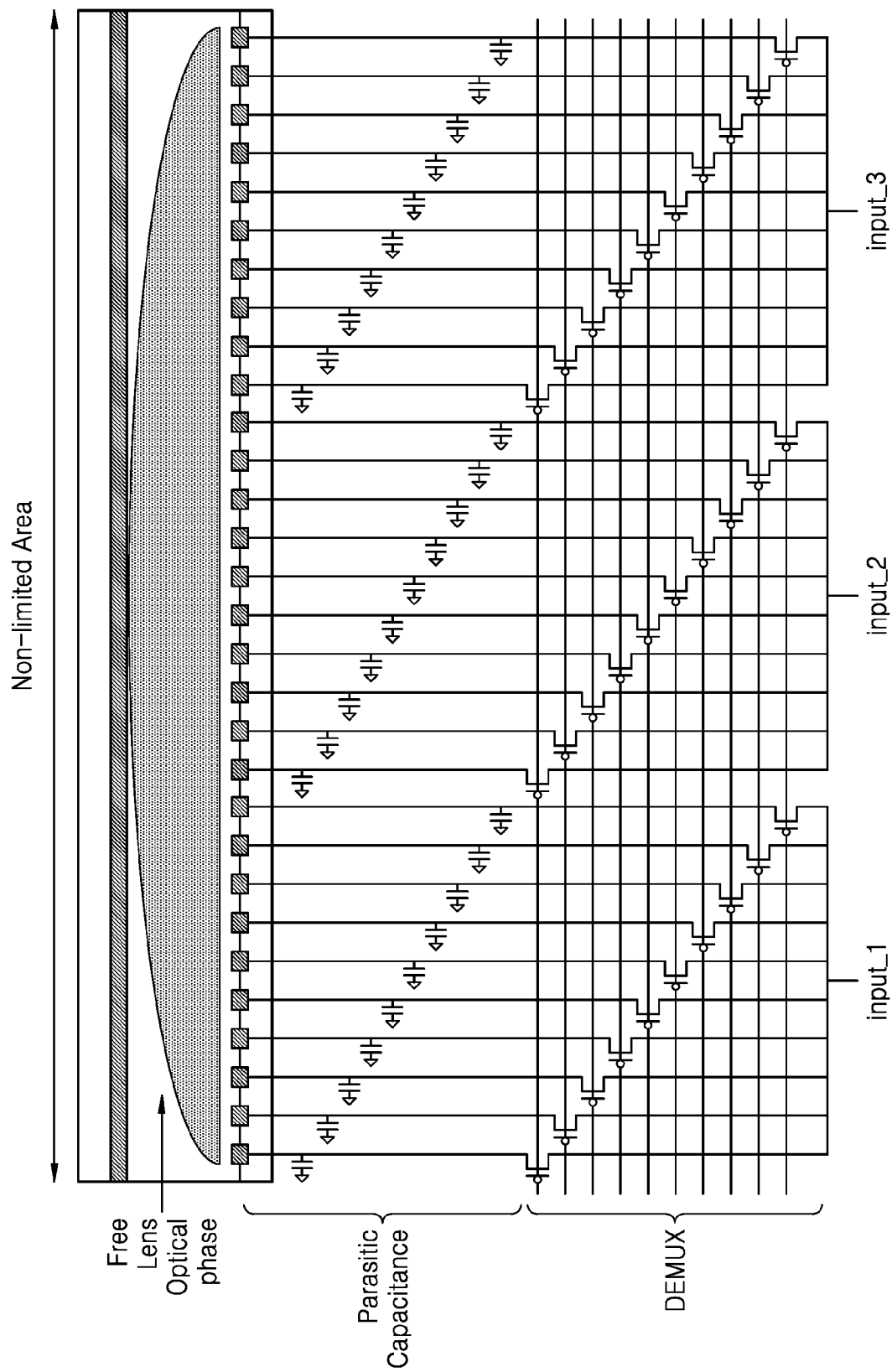
FIG. 10 is a diagram of an architecture of a beam deflection lens according to an example embodiment.

FIG. 10 is a diagram of an architecture of a beam deflection lens according to an example embodiment.

The structure of the beam deflection lens illustrated in FIG. 10 may independently apply different signals to each line of the active area by time-multiplexing one input driving channel to be input. The beam deflection structure of FIG. 10 facilitates individual representation of each line (channels) constituting the beam deflection structure, and accordingly, beam deflection using all active areas may become possible. The features of the present disclosure as described above may facilitate extension of the degree of freedom of steering which has been limited due to repeated input data patterns.

Figure 11:
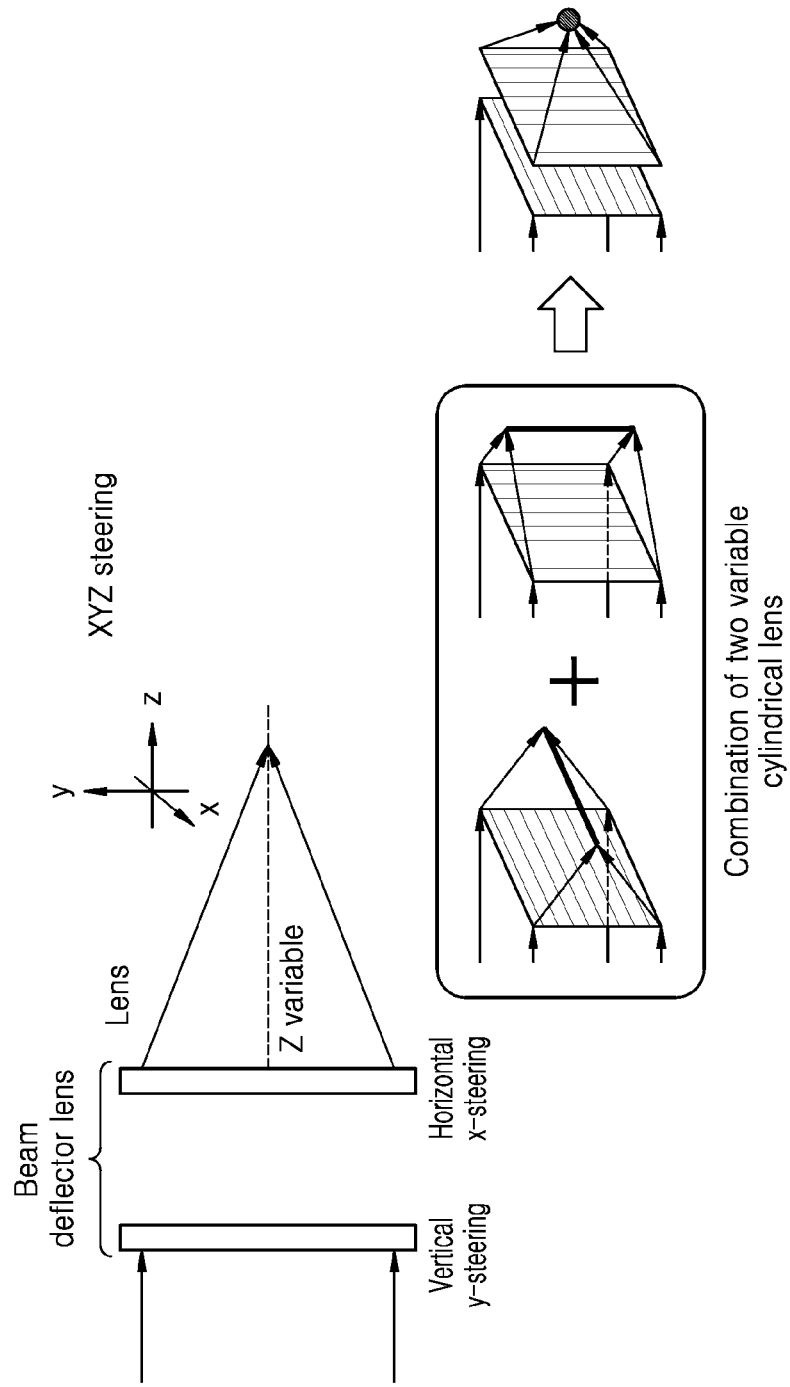
FIG. 11 is a schematic diagram of an eye-tracking device utilizing the beam deflection lens architecture described in FIG. 10.

FIG. 11 is a schematic diagram of an eye-tracking device utilizing the beam deflection lens architecture described in FIG. 10.

When comparing FIG. 11 and FIG. 5, it is understood that the eye-tracking device of FIG. 11 omits a lens to concentrate images on user's eyes. According to the structure shown in FIG. 10, as each line may independently represent data, a lens optical phase profile for z-steering may become possible.

In turn, according to the present disclosure, even when a separate lens for concentrating images is omitted as in FIG. 11, and no component for the z-steering is provided, an eye-tracking device capable of 3D steering may be implemented by utilizing two variable cylindrical lenses. As shown in FIG. 11, a z value representing a focal length of the beam deflection lens may vary to perform the z-steering.

Figure 12:
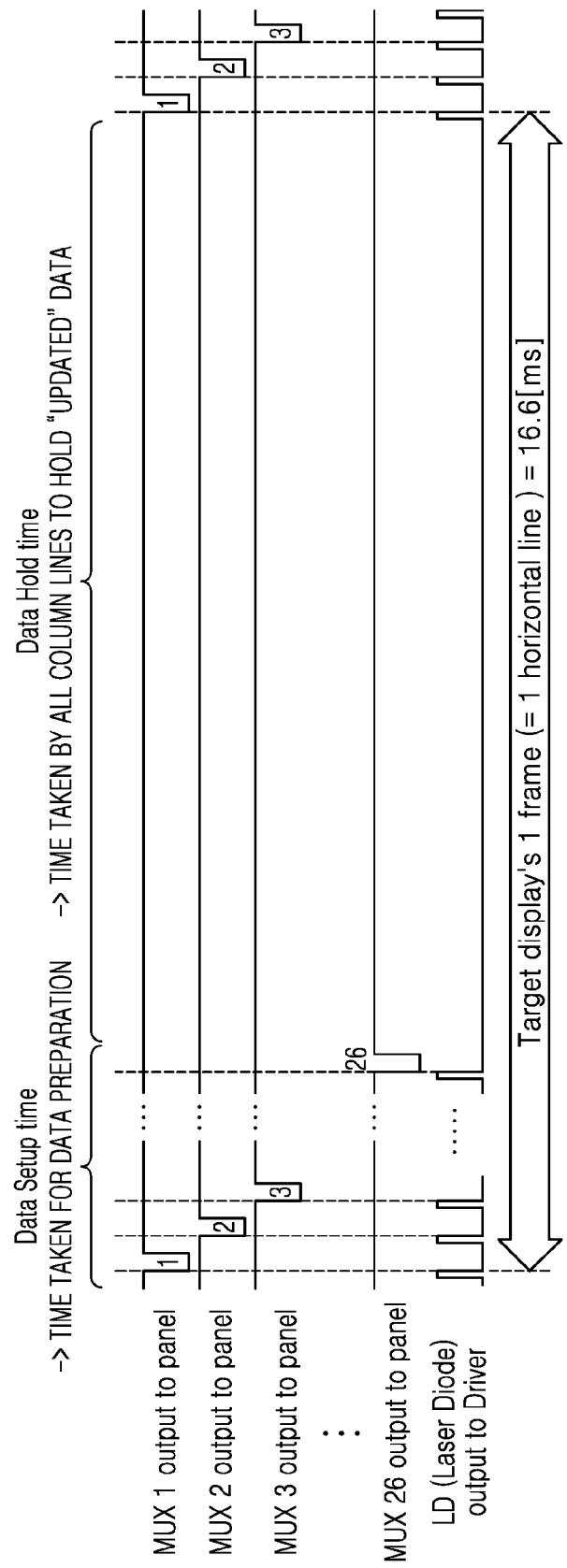
FIG. 12 is a timing diagram schematically illustrating control of operations of a DEMUX connected to each input channel.

FIG. 12 is a timing diagram schematically illustrating control of operations of a DEMUX connected to each input channel.

As illustrated in FIG. 12, a time division control signal is transmitted to each DEMUX so that N outputs may be output for each input (one of input_1, input_2, . . . input_N) in the beam deflector structure according to the present disclosure. More specifically, as the control channel (e.g., the selection line of FIGS. 8 and 9) controlling the DEMUX may control outputs of the DEMUX through the time-multiplexing method, a plurality of signals may be output from one DEMUX in consecutive order according to a set sequence of the control signal.

FIG. 12 is a timing diagram regarding signals input to a beam deflection structure provided with 26 DEMUXs, and signal transmission time points of MUX 1 to MUX 26 in data setup time may be individually controlled. As described above, as the DEMUX is provided with the TFT, when the control signal is time-divided and input to each DEMUX, the TFTs of the DEMUXs may become on/off at individual times, which may change the time points of outputting signals from every channels.

For example, as shown in FIG. 12, in the structure including 26 DEMUXs, when the number of divided channels divided by the DEMUX per input channel is 696, the number of divided channels included in the beam deflection structure would be 18096 in total, and for every 18096 lines, data may be independently transmitted to the electrode patterns at different timings through the time division control signal. That is, through the time-multiplexing method illustrated in FIG. 12, N output channels (divided channels) per one input channel may be created by using limited input channels, and the active area of the beam deflector may be extended.

Figure 13A:
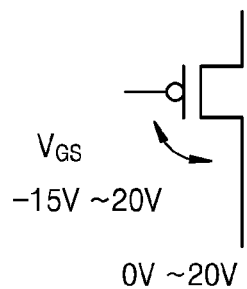
FIGS. 13A to 13C are graphs showing driving conditions of a source channel and a thin-film transistor (TFT) of a DEMUX.
Figure 13B:
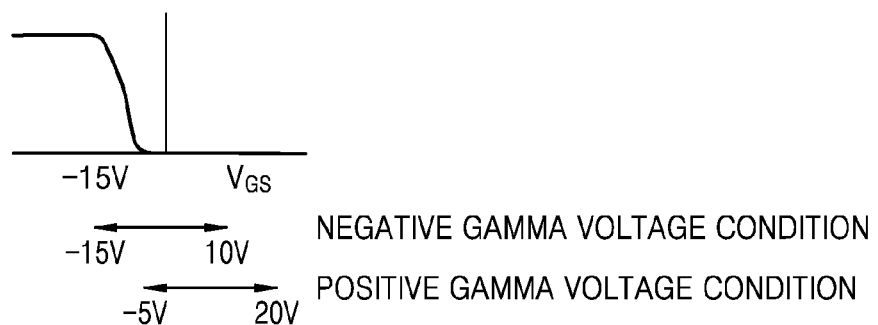
Figure 13C:
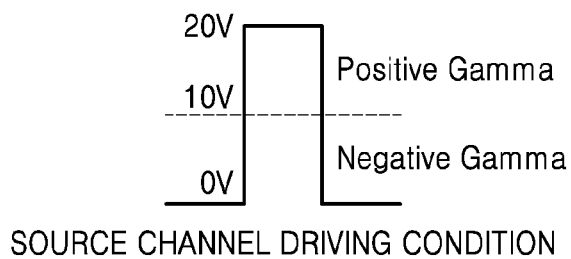

FIGS. 13A to 13C are graphs showing driving conditions of a source channel and a TFT of a DEMUX.

A voltage applied to a source channel may be divided into a negative gamma and a positive gamma as shown in FIG. 13A. In addition, the voltage driving condition $V_{GS}$ of the TFT may be defined as either 0 to 10 V or 10 to 20 V.

The driving voltage condition of a TFT switch may be −15 to 10 V in the case of negative gamma, and −5 to 20 V in the case of positive gamma as shown in FIG. 13B. Accordingly, the final driving voltage may be −15 to 20 V, and the TFT switch operating inside the DEMUX may be turned on at −15 V and off at 20 V.

Figure 14:
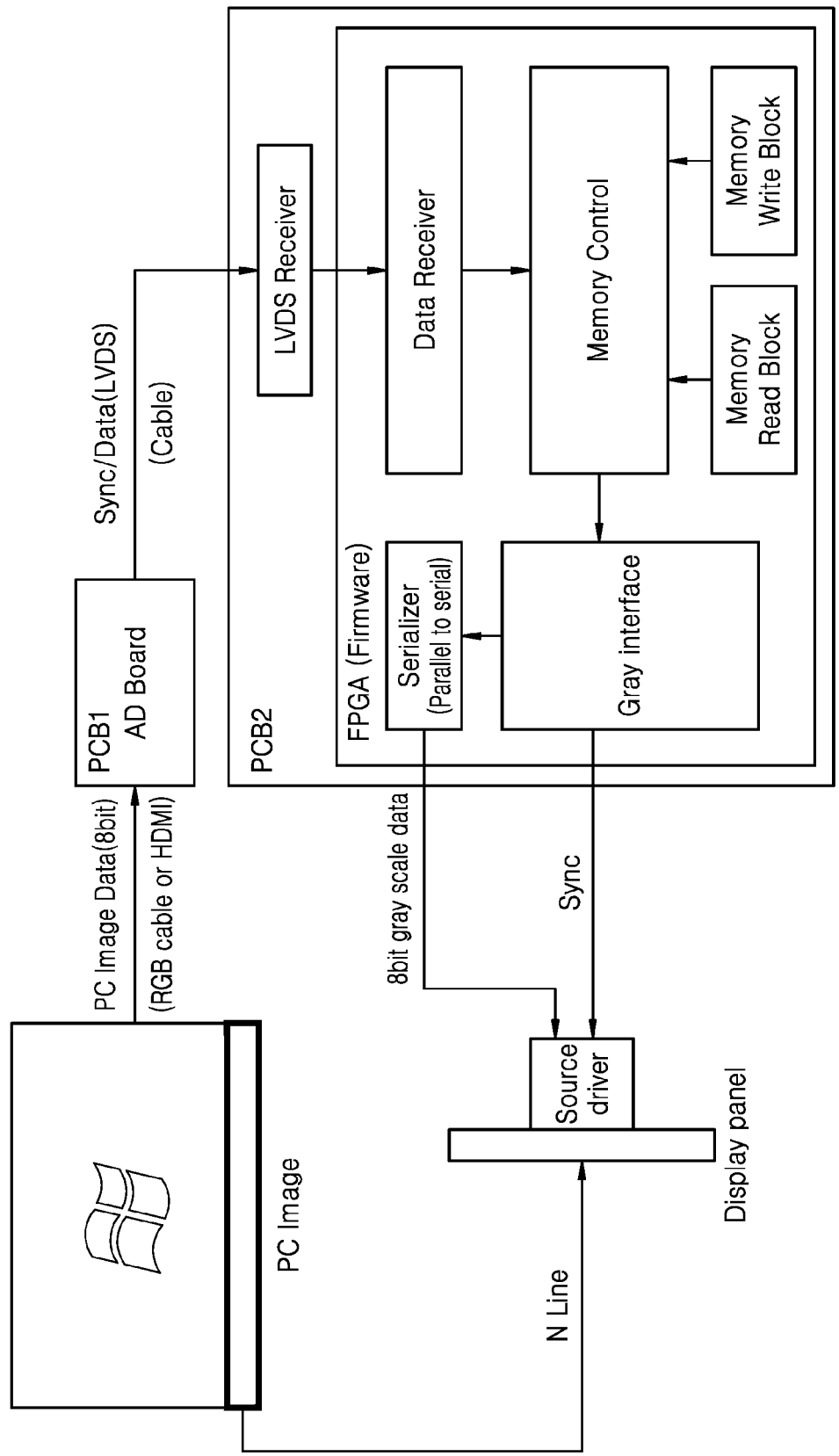
FIG. 14 is a schematic block diagram of a main controller mounted on a beam deflector.

FIG. 14 is a schematic block diagram of a main controller mounted on a beam deflector.

Each line (the divided channels divided by the DEMUX) connected to each electrode pattern of the beam deflector may independently have data, and the data of the respective lines may have 8 bit (1 byte). As described above, when 26 DEMUXs are connected, and there are 696 lines, data of a total of 18096 lines may need to be transmitted, and as a way to transmit such a large volume of data without any error, a video image recording data of every line may be computed and transmitted.

In FIG. 14, the video data transmitted to the beam deflector may be primarily processed into digital data through an analog-to-digital (AD) converter in a printed circuit board (PCB) 1 provided in a receiver of the beam deflector. Then, the video data may be transmitted to a PCB2 and processed secondarily by a firmware implemented in a field programmable gate array (FPGA) and transmitted to a source drive integrated chip (IC).

Figure 15:
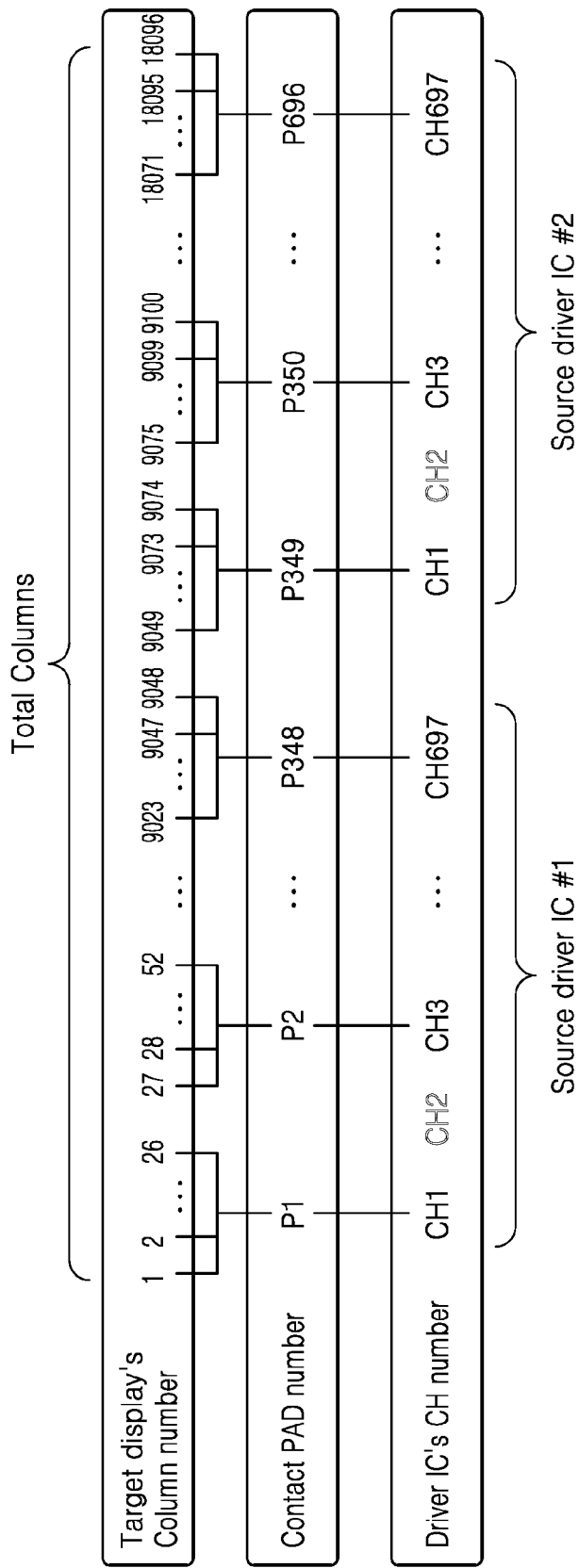
FIG. 15 is a schematic diagram illustrating that data is individually applied to each of 18096 lines constituting a beam deflector.

FIG. 15 is a schematic diagram illustrating that data is individually applied to each of 18096 lines constituting a beam deflector.

In FIG. 15, 26 lines are allocated for each input channel, and each input channel has been divided by the DEMUX.

Figure 16:
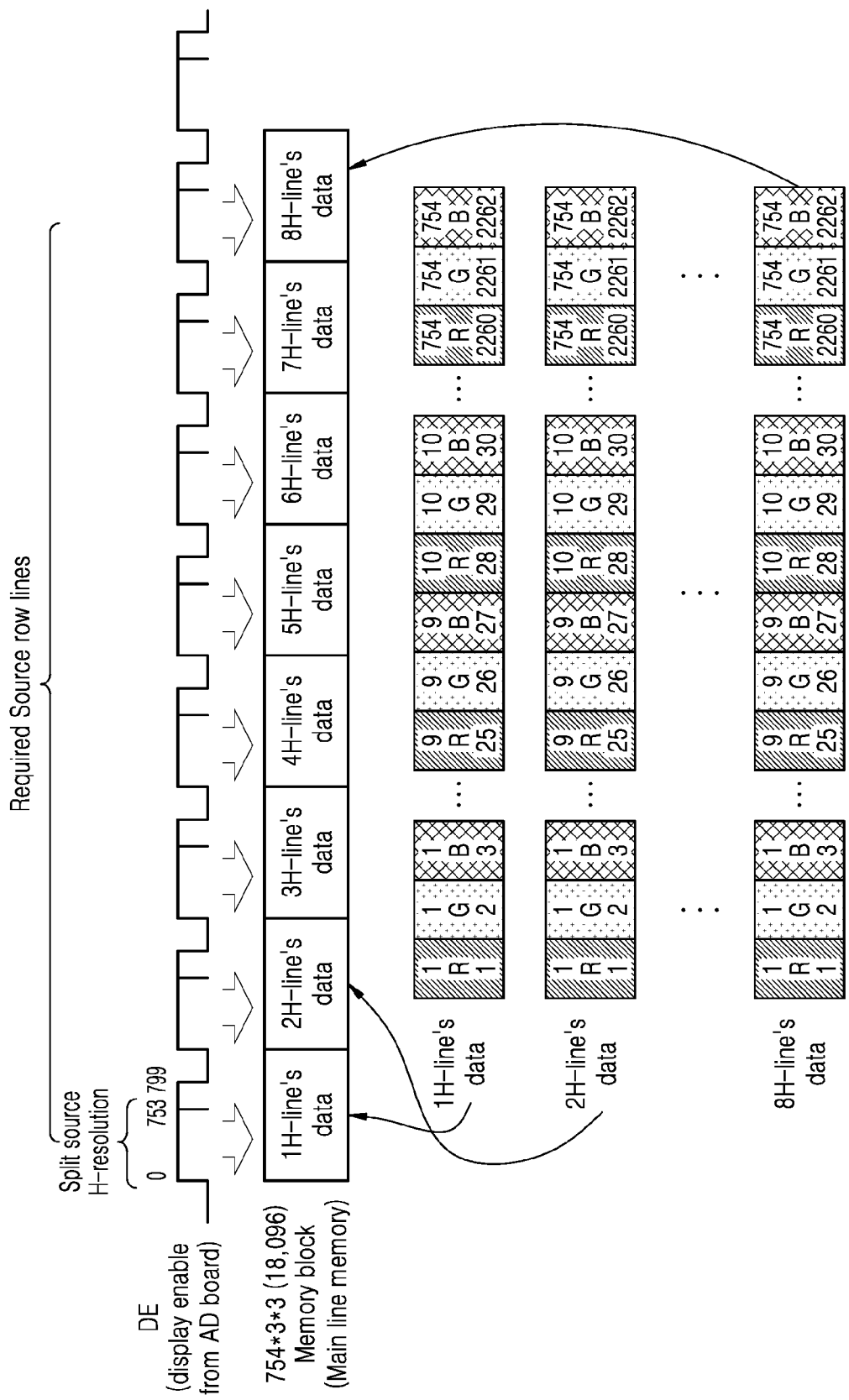
FIG. 16 is a conceptual diagram schematically illustrating operations regarding video data transmitted to a beam deflector.

FIG. 16 is a conceptual diagram schematically illustrating operations regarding video data transmitted to a beam deflector.

More specifically, the diagram of FIG. 16 schematically illustrates through what process the video image type data received by the beam deflector is read from the memory of the beam deflector, and the resolution of the video image is regarded as 800*600 pixels. Each of red, green and blue (RGB) light of the video data may define 8 bit data transmitted to each line, and data to be transmitted to a total of 18096 lines may be obtained by processing data of 754*8 (bit)*3 (RGB).

Figure 17:
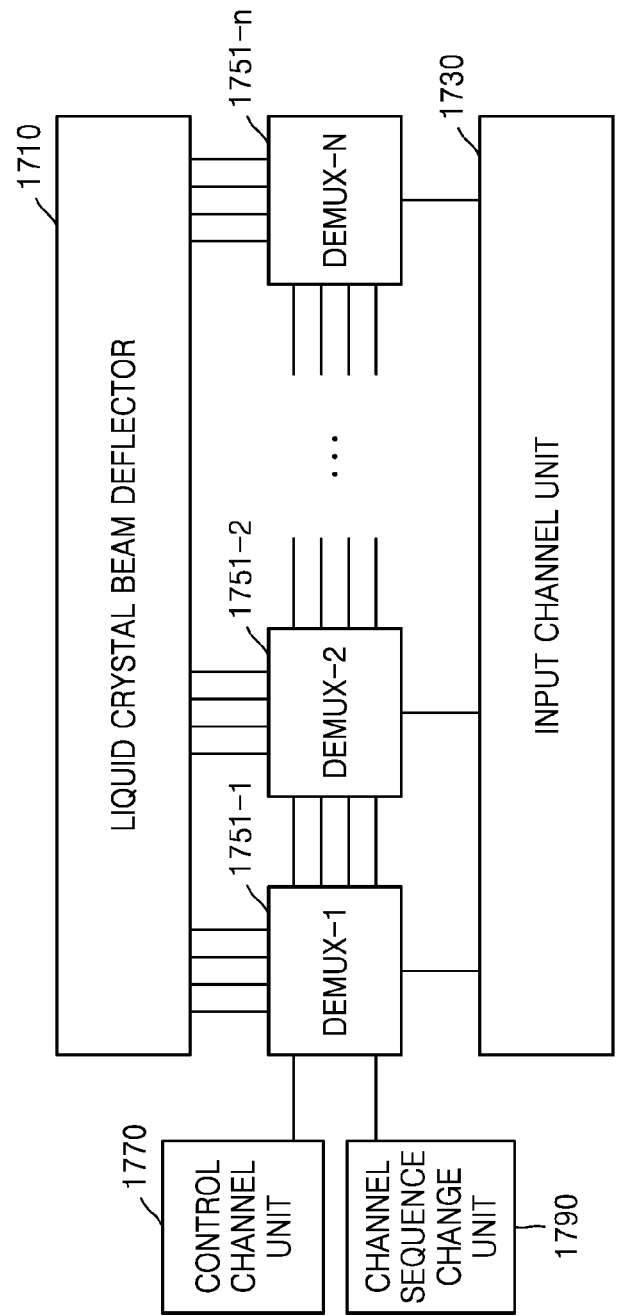
FIG. 17 is a block diagram of a beam deflector lens structure according to an example embodiment.

FIG. 17 is a block diagram of a structure of a beam deflector lens according to an example embodiment.

With reference to FIG. 17, the beam deflector lens according to the present disclosure may include a liquid crystal beam deflector 1710, an input channel unit 1730, a plurality of DEMUXs 1751-1 to 1751-n, a control channel unit (e.g., a control circuit) 1770, and a channel sequence change unit 1790. FIG. 17 schematically illustrates components which are necessary for explaining features of the beam deflector lens, and other components are omitted.

First, the liquid crystal beam deflector 1710 may have substantially the same structure as the liquid crystal beam deflector 100 described with reference to FIGS. 1 to 3. The liquid crystal beam deflector 1710 may include a first electrode layer, a second electrode layer, and a liquid crystal layer including a plurality of liquid crystal molecules arranged in a first direction between the first electrode layer and the second electrode layer. The first electrode layer may include a plurality of electrode patterns arranged on the first substrate, and the second electrode layer may be arranged on the second substrate different from the first substrate.

The input channel unit 1730 may include a plurality of input channels.

The number of input channels may be 26. As described through FIG. 3, when data is input through the input channels of the input channel unit 1730, the data is transmitted to the electrode patterns of the liquid crystal beam deflector 1710 through a DEMUX, which causes a potential difference between the first electrode layer and the second electrode layer, and accordingly, an optical path conversion surface which may deflect incident light may be formed.

The DEMUXs 1751-1 to 1751-n may divide each of the input channels included in the input channel unit into a preset number of division units to connect the divided channels to the electrode patterns of the first electrode layer. The number of DEMUXs may be identical to the number of input channels.

Further, the number of divided channels into which one input channel is divided by the DEMUXs 1751-1 to 1751-n may be 696. Further, the DEMUXs 1751-1 to 1751-n may include the same number of switches as the divided channels, and the switches may be P-type TFT. Also, the DEMUXs 1751-1 to 1751-n may receive signals from the control channel unit 1770 and the channel sequence change unit 1790 described below, and operate based on the received signal. This will be described later.

The control channel unit 1770 may be connected to the DEMUXs 1751-1 to 1751-n and control output signals output from the divided channels to the first electrode layer.

Further, the control channel 1770 may control output times of output signals output from different divided channels to avoid an overlap of the output times. The embodiment describes in detail the time-multiplexing method explained with reference to FIG. 12 in the above-defined terms.

Further, the control channel unit 1770 may control signals output through each divided channel by controlling the on/off state of the switch provided in the respective divided channels. It has been already explained with reference to FIGS. 10 to 13 that the time division control may be enabled by the on/off operations of the TFT switch.

Also, the control channel unit 1770 may include a plurality of control channels, and the number of control channels may be identical to the number of divisions. Here, the control channel may be the same module as the selection line controlling the DEMUX in FIGS. 7 to 9. For example, when a signal is input to the first control channel, the TFT element of each DEMUX connected to the first control channel may operate to be on or off.

The channel sequence change unit 1790 may change the sequence of the divided channels included in the DEMUX for every preset period. The channel sequence change unit 1790 may randomly change the sequence of the divided channels. Also, the channel sequence change unit 1790 may randomly change the sequence of the divided channels, excluding preset sequences. The channel sequence change unit 1790 is a module to minimize deterioration of image quality caused by harmonic noise due to errors of some TFT elements included in the DEMUX, and this will be described in detail with reference to FIGS. 18 to 20. In some embodiments, the channel sequence change unit 1790 may be omitted from the beam deflector lens structure.

Figure 18:
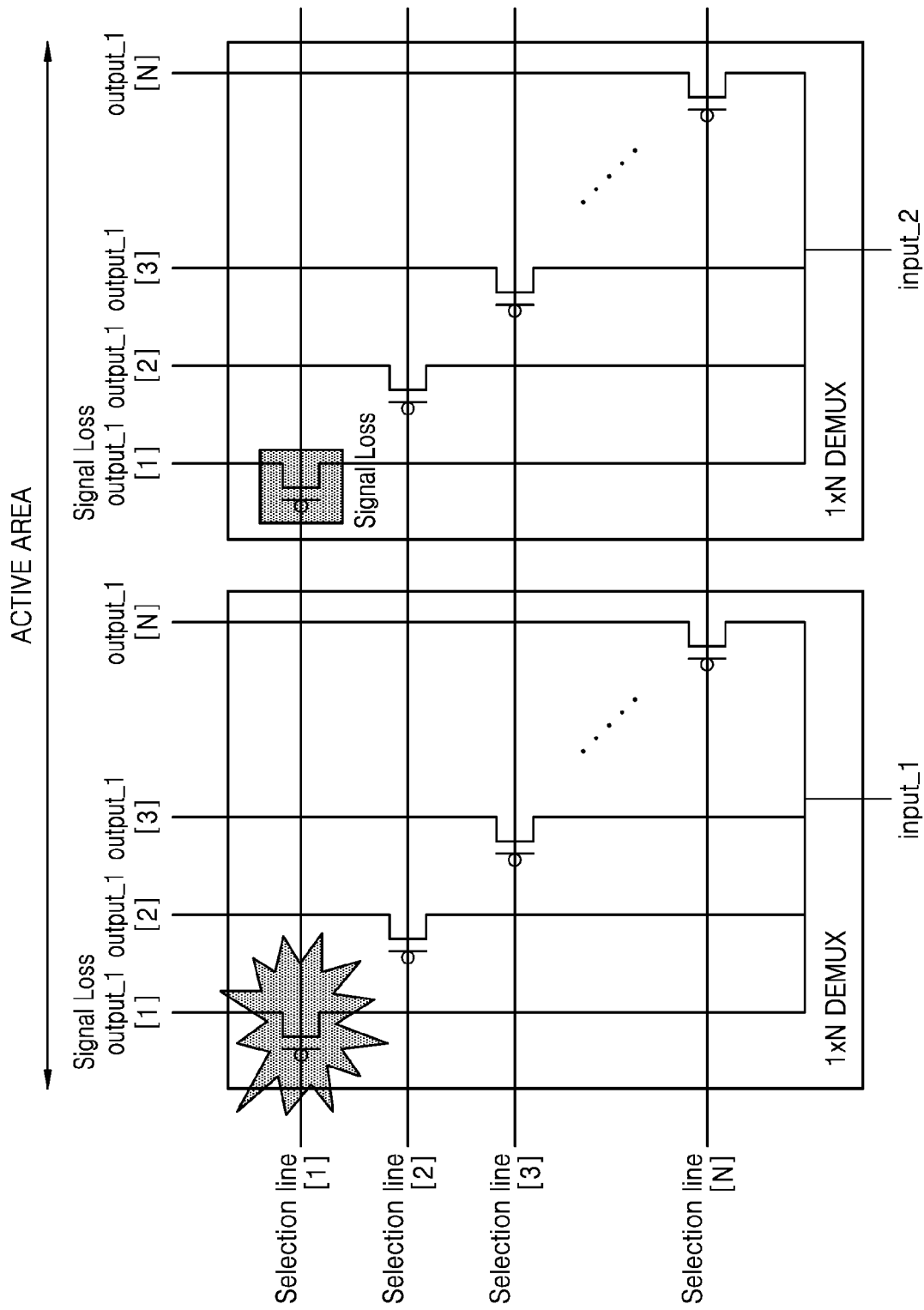
FIG. 18 is a diagram for explaining a phenomenon of harmonic noise generation.

FIG. 18 is a diagram for explaining a phenomenon of harmonic noise generation.

In the beam deflector structure according to the present disclosure, all DEMUXs may share one line through the selection line. In such a shared connection, when the TFT element is damaged or connection status is destroyed due to a defective selection line, a signal loss, which refers to a failure to transmit signals to all DEMUXs, may occur.

Figure 19:
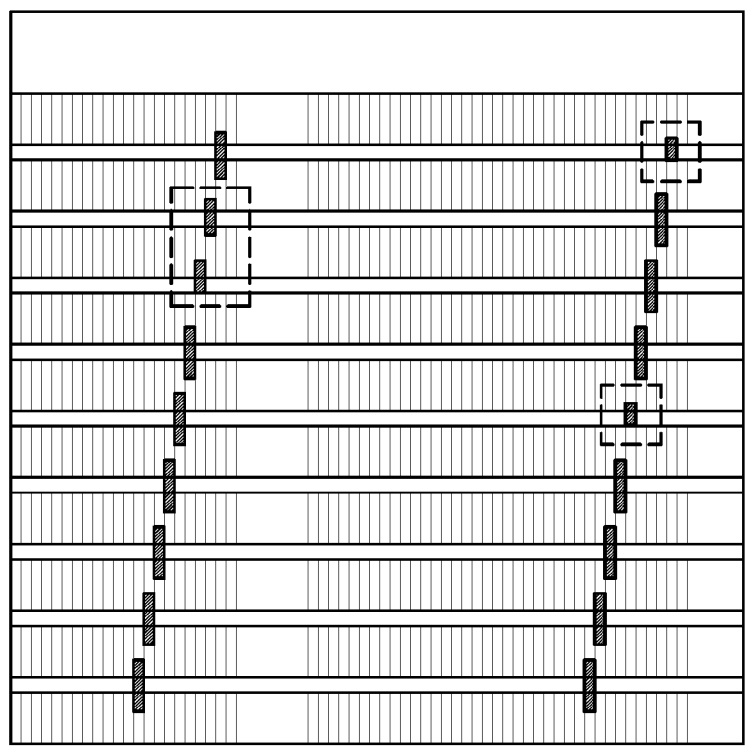
FIG. 19 is a diagram schematically illustrating damage that has occurred on a TFT.

FIG. 19 is a diagram schematically illustrating occurrence of damages on a TFT.

FIG. 19 shows a defect in the DEMUX included in the beam deflector structure, and more specifically, three TFT elements emphasized by a dotted-lined box are burned out due to electrical static discharge (ESD), in which case a user using the beam deflector may observe harmonic noise in a 3D image.

The harmonic noise occurring in a 3D image may be generated due to a sharing structure of the DEMUX and periodic connection characteristics, and categorized as high-intensity noise which can be easily observed by the naked eyes.

Figure 20:
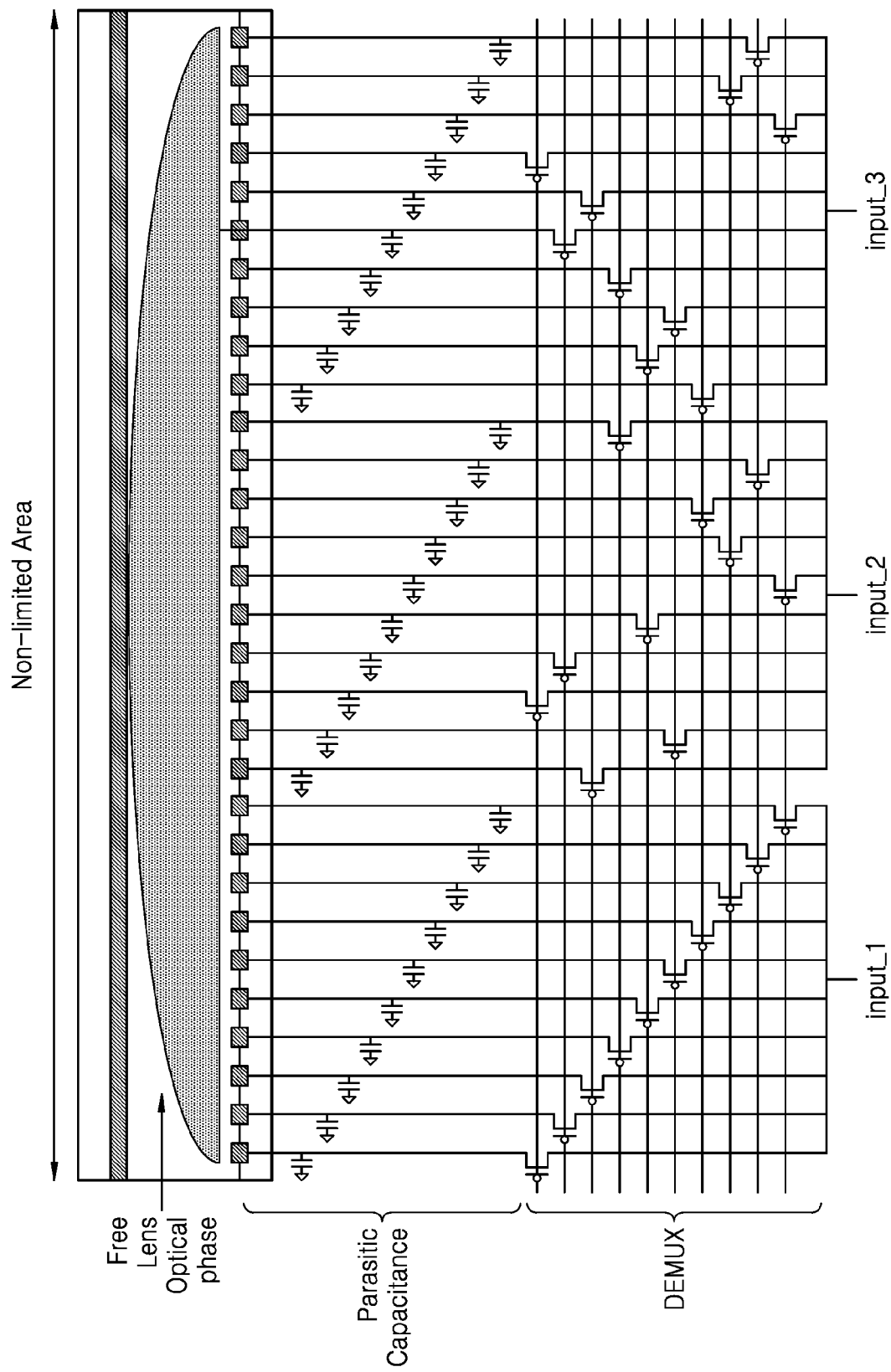
FIG. 20 is a schematic diagram of a structure of a beam deflector for reducing harmonic noise.

FIG. 20 is a schematic diagram of a structure of a beam deflector for reducing harmonic noise.

When comparing FIG. 20 with FIG. 10, it is understood that arrangement sequence of the TFT switches included in the DEMUXs corresponding to the second input channel and the third input channel is randomly changed. Through the method of redefining the selection line of the DEMUX for every preset period, harmonic noise may be reduced significantly. The channel sequence change unit 1790 described with reference to FIG. 17 may store a period and algorithm to redefine the selection line of the DEMUX.

More specifically, the channel sequence change unit 1790 may exclude some arrangement sequences which may increase harmonic noise when redefining the selection line.

Figure 21:
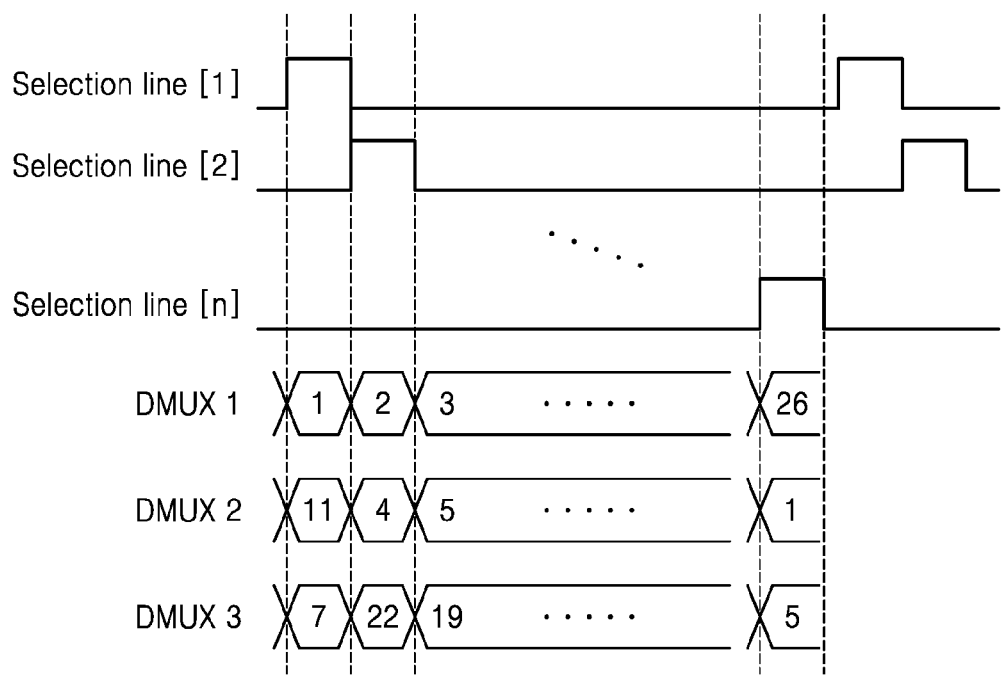
FIG. 21 is a timing diagram explaining a control algorithm for reducing harmonic noise.

FIG. 21 is a timing diagram explaining a control algorithm for reducing harmonic noise.

In FIG. 21, as first to twenty-sixth TFT elements are sequentially arranged in DMUX1, while the inside TFT elements are arranged randomly in DMUX 2 and DMUX3, the harmonic noise may be reduced significantly. With reference to FIG. 21, given that the TFT element constituting Selection Line 1 is TFT1 of DMUX1, TFT11 of DMUX2, and TFT7 of DMUX3, and the TFT element constituting Selection Line2 is TFT2 of DMUX1, TFT4 of DMUX2, and TFT22 of DMUX3, it is understood that the selection line is randomly formed. For example, when numbers assigned to the TFT elements in each DMUX represent relative positions of the TFT elements in the DMUX, a same selection line (e.g., Selection Line 1) may connected to TFT elements (e.g., TFT 1 of DMUX1, TFT11 of DMUX2, and TFT7 of DMUX3 which have relative positions 1, 11, and 7 in DMUX1, DMUX2, and DMUX3, respectively) that have different relative positions in each of different DMUXes.

The channel sequence change unit 1790 may control data to be transmitted to each line to be rearranged in accordance with changes of the TFT elements before transmission so that data finally output through the beam deflector may not be affected.

Figure 22:
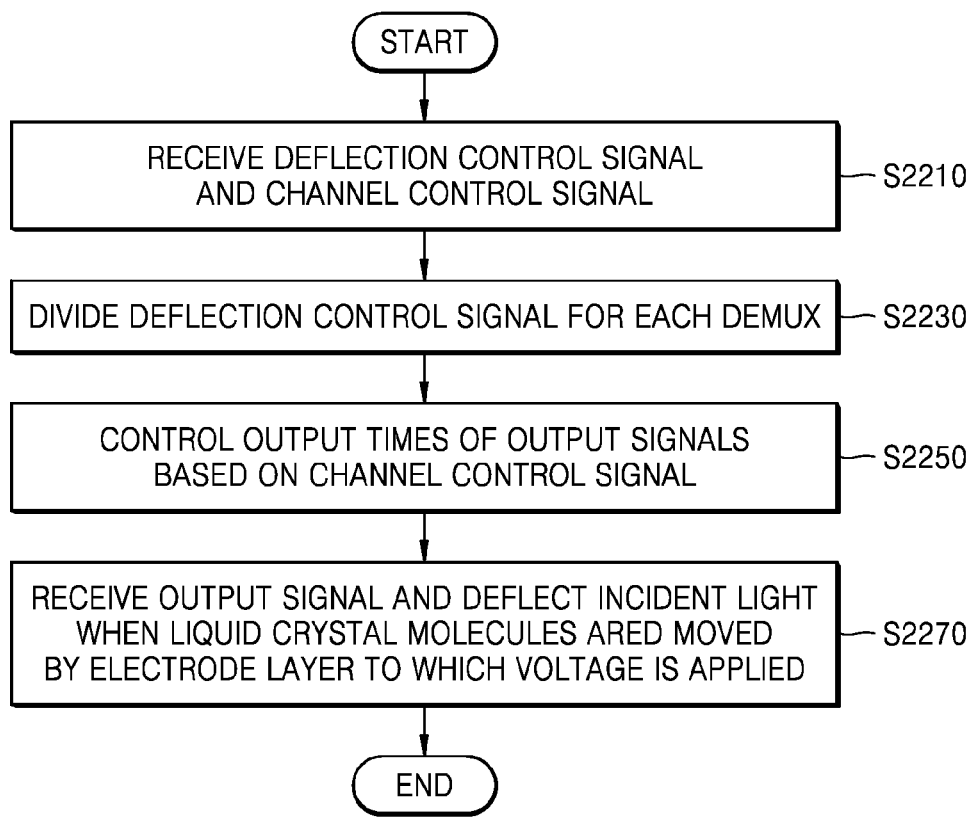
FIG. 22 is a flowchart of an example of a driving method of a beam deflector according to the present disclosure.

FIG. 22 is a flowchart of an example of a driving method of a beam deflector according to the present disclosure.

As the method according to FIG. 22 may be implemented by the beam deflector described with reference to FIGS. 5 to 21, redundant descriptions thereon will be omitted.

First, the input channel unit 1730 including a plurality of input channels may receive a deflection control signal and a channel control signal (S2210).

In operation S2210, the deflection control signal may refer to a signal to cause deflection by applying a certain voltage to electrode patterns, and the channel control signal may refer to a signal to control the plurality of DEMUXs 1751-1 to 1751-n by the control channel unit 1770. More specifically, the channel control signal may be a signal to which the control channel unit 1770 refers to define the selection line, and may include a signal to redefine a preset selection line by the channel sequence change unit 1790 in some embodiments.

The input channel unit 1730 may divide the deflection control signal for each DEMUX 1751-1 to 1751-n dividing the input channels into a plurality of divided channels (S2230). The divided deflection control signal may be input to a corresponding DEMUX, and when the deflection control signal is output through the DEMUX, it may become an output signal. Also, the input channels divided by the DEMUX may be referred to as divided channels.

The control channel unit 1770 may control output times of output signals output from different divided channels based on the channel control signal to avoid an overlap of the output times (S2250). It has been already described that the control method of S2250 is a time-multiplexing method.

The liquid crystal beam deflector may receive the output signals output from the DEMUX, and when the liquid crystal molecules adjacent to the electrode layer are moved by the electrode layer to which a voltage is applied, deflect incident light by the liquid crystal molecules (S2270).

The embodiments according to the present disclosure described above may be implemented in the form of a computer program which can be executed in a computer through various components, and such computer program may be recorded on a computer-readable medium. At this time, the medium may include a magnetic medium, such as a hard disk, a floppy disk, and a magnetic tape, an optical recording medium, such as a CD-ROM and a DVD, a magneto-optical medium, such as a floptical disk, a hardware devices specially configured to store and execute program instructions, such as read-only memory (ROM), random-access memory (RAM), flash memory, etc.

Meanwhile, the computer program may be specifically designed and configured for the present disclosure, or may be publicly known to those skilled in the art of computer software. Examples of the computer program may also include not only machine language codes generated by a compiler but computer-executable high level language codes generated by using an interpreter, etc.

The particular implementations shown and described herein are illustrative examples of embodiments and are not intended to otherwise limit the scope of embodiments in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of embodiments unless the element is specifically described as "essential" or "critical."

The use of the terms "a" and "an" and "the" and similar referents in the context of describing embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. Embodiments are not limited to the described order of the steps. The use of any and all examples, or exemplary language (e.g., "such as") provided herein, is intended merely to better illuminate embodiments and does not pose a limitation on the scope of embodiments unless otherwise claimed. Numerous modifications and adaptations will be readily apparent to one of ordinary skill in the art without departing from the spirit and scope of the inventive concept.

The beam deflector according to the present disclosure may have a wide range of representation of optical phase profiles, compared to conventional beam deflectors.

Further, the eye-tracking device implemented by the beam deflector according to the present disclosure may stably provide a 3D image to a user without a separate component for Z-axis steering.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A beam deflector comprising:
   a first electrode layer comprising a plurality of electrode patterns that are arranged in a first direction;
   a second electrode layer provided to oppose the first electrode layer;
   a liquid crystal layer provided between the first electrode layer and the second electrode layer in a second direction perpendicular to the first direction, the liquid crystal layer comprising a plurality of liquid crystal molecules;
   an input channel unit comprising a plurality of input channels;
   a demultiplexer configured to divide each of the input channels into a preset number of divided channels, and connect the divided channels to the electrode patterns;
   a control circuit connected to the demultiplexer, and configured to control an output signal output from the divided channels to the first electrode layer; and
   a channel sequence change circuit configured to change a sequence of the divided channels included in the demultiplexer for a preset period.

2. The beam deflector of claim 1, wherein the plurality of liquid crystal molecules comprise positive liquid crystal molecules that move in the second direction according to a voltage applied to the electrode patterns.

3. The beam deflector of claim 1, wherein a number of the demultiplexer is identical to a number of the input channels.

4. The beam deflector of claim 1, wherein the demultiplexer comprises a same number of switches as a number of the divided channels.

5. The beam deflector of claim 4, wherein each of the switches is a thin-film transistor (TFT).

6. The beam deflector of claim 5, wherein the TFT is a P-type TFT.

7. The beam deflector of claim 1, wherein the control circuit is configured to control output times of output signals output from the divided channels, to avoid an overlap of the output times.

8. The beam deflector of claim 7, wherein the control circuit is configured to control output signals from the respective divided channels, by controlling on and off states of switches provided in each of the divided channels.

9. The beam deflector of claim 7, wherein the control circuit comprises a plurality of control channels, and a number of the plurality of control channels is identical to a number of the divided channels.

10. The beam deflector of claim 1, wherein the channel sequence change circuit is configured to randomly change the sequence of the divided channels.

11. The beam deflector of claim 1, wherein the channel sequence change circuit is configured to randomly change the sequence of the divided channels, excluding preset sequences.

12. An eye-tracking device comprising two of the beam deflector of claim 1.

13. The eye-tracking device of claim 12, wherein the eye-tracking device is not provided with a component that provides steering in a Z-axis direction, and is implemented with the two beam deflectors overlapping in the Z-axis direction.

14. The eye-tracking device of claim 12, wherein the eye-tracking device is not provided with a lens that concentrates light deflected by the two beam deflectors to provide the concentrated light to a user, and is implemented with the two beam deflectors overlapping.

15. An operating method of a beam deflector, the operating method comprising:
receiving, by an input channel unit including a plurality of input channels, a deflection control signal and a channel control signal;
dividing, by the input channel unit, the deflection control signal for each demultiplexer dividing the plurality of input channels into a plurality of divided channels;
controlling, by a control circuit, output times of output signals output from the plurality of divided channels based on the channel control signal, to avoid an overlap of the output times; and
deflecting an incident light by liquid crystal molecules that move according to a voltage is applied an electrode layer,
wherein the operating method further comprises changing, by a channel sequence change circuit, a sequence of the divided channels included in the demultiplexer for a preset period.

16. The operating method of claim 15, wherein the deflection control signal and the channel control signal are included in one video image of a preset resolution.

17. The operating method of claim 15, wherein the deflecting by the liquid crystal molecules comprises, when an optical path conversion surface is formed by movement of the liquid crystal molecules, a refractive index of the incident light is changed at the optical path conversion surface.

18. An electronic device comprising:

a plurality of input channels;

a plurality of demultiplexers connected to the plurality of input channels in a one-to-one correspondence, and configured to receive a plurality of input signals from the plurality of input channels, respectively, wherein each of the plurality of demultiplexers is configured to receive one of the plurality of input signals, and is connected to a plurality of different selection lines to obtain a plurality of output signals by processing the one of the plurality of input signals in a plurality of different manners according to the plurality of different selection lines, and is configured to divide each of the input channels into a preset number of divided channels;

a beam deflector comprising a first electrode layer, a second electrode layer, a liquid crystal layer disposed between the first electrode layer and the second electrode layer, and configure to deflect a light incident onto the beam deflector by applying a voltage between the first electrode layer and the second electrode layer based on the plurality of output signals from the plurality of demultiplexers, a control circuit connected to the demultiplexer, and configure to control the output signal output from the divided channels to the first electrode layer, and a channel sequence change circuit configured to change a sequence of the divided channels included in the demultiplexer for a preset period; and a display configured to generate an image based on the deflected light.

19. The electronic device of claim 18, wherein each of the plurality of demultiplexers comprises a plurality of switches connected to the plurality of different selection lines, and configured to turn on according to control signals from the plurality of different selection lines, respectively.

* * * * *